US008838812B2

(12) United States Patent
Miller et al.

(10) Patent No.: US 8,838,812 B2
(45) Date of Patent: Sep. 16, 2014

(54) NETWORK SECURITY ENHANCEMENT METHODS, APPARATUSES, SYSTEM, MEDIA, SIGNALS AND COMPUTER PROGRAMS

(75) Inventors: Nicholas R. Miller, West Vancouver (CA); Sheng Fu (Sunny) Cheng, Coquitlam (CA)

(73) Assignee: AirPatrol Corporation, Maple Lawn, MD (US)

( * ) Notice: Subject to any disclaimer, the term of this patent is extended or adjusted under 35 U.S.C. 154(b) by 809 days.

(21) Appl. No.: 11/570,876

(22) PCT Filed: Jul. 19, 2005

(86) PCT No.: PCT/CA2005/001130
§ 371 (c)(1),
(2), (4) Date: Dec. 18, 2006

(87) PCT Pub. No.: WO2006/084348
PCT Pub. Date: Aug. 17, 2006

(65) Prior Publication Data
US 2007/0250910 A1    Oct. 25, 2007

Related U.S. Application Data

(60) Provisional application No. 60/653,608, filed on Feb. 16, 2005.

(30) Foreign Application Priority Data

Feb. 8, 2005    (CA) ..................................... 2496939

(51) Int. Cl.
*H04L 29/06*    (2006.01)
*H04L 29/10*    (2006.01)
*G06F 15/16*    (2006.01)
*G06F 7/04*    (2006.01)
*H04W 76/02*    (2009.01)
*H04W 92/10*    (2009.01)
*H04L 9/32*    (2006.01)

(52) U.S. Cl.
CPC .............. *H04W 76/02* (2013.01); *H04W 92/10* (2013.01); *H04L 9/32* (2013.01)
USPC ................................ 709/228; 709/225; 706/3

(58) Field of Classification Search
CPC ..... H04W 84/12; H04W 88/06; H04W 40/24; H04W 48/16
USPC ............. 726/22; 713/201, 200; 370/230, 328, 370/310; 709/223; 719/321
See application file for complete search history.

(56) References Cited

U.S. PATENT DOCUMENTS 6,131,136 A * 10/2000 Liebenow et al. ............ 710/316
6,628,965 B1 * 9/2003 LaRosa et al. ................ 455/557

(Continued)

FOREIGN PATENT DOCUMENTS

WO    WO 99/30478    6/1999
WO    WO-2006084348 A1    8/2006

OTHER PUBLICATIONS

M.S. Bargh; Fast Authentication Methods for Handovers between IEEE 802.11 Wireless LANs; ACM, New york; Year of Publication: 2004 ; pp. 51-60.*

(Continued)

*Primary Examiner* — Saleh Najjar
*Assistant Examiner* — Feliciano Mejia
(74) *Attorney, Agent, or Firm* — Schwegman Lundberg & Woessner, P.A.

(57)    ABSTRACT

A method involves causing a wireless network interface of a computing device to be disabled, in response to detection of a network connection between the computing device and a wired network. Related apparatuses, systems, computer programs, computer-readable media and signals are also provided.

40 Claims, 7 Drawing Sheets

(56) References Cited

U.S. PATENT DOCUMENTS

| | | | | |
|---|---|---|---|---|
| 7,322,044 | B2* | 1/2008 | Hrastar | 726/22 |
| 2003/0135762 | A1* | 7/2003 | Macaulay | 713/201 |
| 2003/0221122 | A1* | 11/2003 | Hatori | 713/200 |
| 2004/0123150 | A1* | 6/2004 | Wright et al. | 713/201 |
| 2005/0091357 | A1* | 4/2005 | Krantz et al. | 709/223 |
| 2005/0149948 | A1* | 7/2005 | Gupta et al. | 719/321 |
| 2006/0072455 | A1* | 4/2006 | Cai et al. | 370/230 |
| 2007/0274250 | A1* | 11/2007 | Chen et al. | 370/328 |
| 2008/0019294 | A1* | 1/2008 | Inoue et al. | 370/310 |

OTHER PUBLICATIONS

"European Application Serial No. 05768197.5, Extended European Search Report mailed Nov. 30, 2009", 3 pgs.

"European Application Serial No. 05768197.5, Office Action mailed Feb. 9, 2010", 1 pg.

"European Application Serial No. 05768197.5, Office Action mailed Nov. 12, 2012", 5 pgs.

"European Application Serial No. 05768197.5, Office Action mailed Nov. 28, 2007", 2 pgs.

"European Application Serial No. 05768197.5, Response filed Jan. 24, 2008 to Office Action mailed Nov. 28, 2007", 2 pgs.

"European Application Serial No. 05768197.5, Response filed Jun. 14, 2010 to Office Action mailed Feb. 9, 2010", 11 pgs.

"European Application Serial No. 05768197.5, Supplementary European Search Report mailed Dec. 17, 2009", 4 pgs.

"International Application Serial No. PCT/CA2005/001130, International Preliminary Report on Patentability mailed Aug. 14, 2007", 7 pgs.

"International Application Serial No. PCT/CA2005/001130, International Search Report mailed Nov. 25, 2005", 1 pg.

"International Application Serial No. PCT/CA2005/001130, Written Opinion mailed Nov. 25, 2005", 6 pgs.

"Cirond Airsafe", Cinrod Corporation URL:http://www.sabar.com.au/files/cinrond_airsafe.pdf, (Nov. 18, 2005).

"How to Enable and Diable Network Connections in Windows XP", About.com, http://compnetworking.about.com/od/windowsxpnetworking/ht/conndienable.htm.

"PRB: Cannot Enable or Diable a Network Device from the Network Connection Folder", Microsoft Help and Support http://support.microsoft.com/default.aspx?scid=kb;en-us;318291, (Jul. 22, 2004).

"Preventing crosstalk from wired to wireless", Techworld—The UK's Infrastructure & network knowledge centre, http://www.techworld.com/mobility/feature/index.cfm?featureid=543&Page=3& pagePos=19, (Apr. 30, 2004).

"Preventing crosstalk from wired to wireless", The Wireless Wizards, URL:http://www.techworld.com/mobility/features/index.cfm?featureid=543&Page=3&pagePos=19>, 1-96.

"Tackling Security vulnerabilities in VPN-based Wireless Deployments", Proceedings Of 2004 IEEE Conference on Wireless Communications and Networking, Proceedings of 2004 IEEE Conference in Wireless communications and Networking Atlanta, Georgia, vol. 1, ISBN: 0-7803-8533-0, Retrieved from the Internet: URL:http://ieeexplore.ieee.org/xpls/abs_all.jsp?arnumber=1312460> [retrieved on Nov. 19, 2009] Section III. Possible Solutions to the Hidden Wireless Router (HWR) Problem, (Jun. 2004), 100-104.

"European Application Serial No. 05768197.5, Response filed Jun. 14, 2013 to Examination Notification Art. 94(3) mailed Dec. 11, 2012", 16 pgs.

Microsoft Help and Support, "PRB: Cannot Enable or Disable a Network Device from the Network Connections Folder," http://support.microsoft.com/default, visited Nov. 23, 2005, 1 pg.

Techworld, "Preventing Crosstalk from Wired to Wireless," www.techworld.com/mobility/features /index.cfm?featureid=543&Page=3&pagePos=19, Apr. 30, 2004, visited Nov. 23, 2005, 2 pgs.

Cirond Corporation, "Cirond Airsafe," www.sabr.com.au/files/cirond_airsafe.pdf, visited Nov. 18, 2005, 2 pages.

About.com, "How to Enable and Disable Network Connections in Windows XP," http://compnetworking.about.com/od/windowsxpnetworking/ht/conndisenable_phtm, visited Nov. 23, 2005, 1 pg.

Extended European Search Report for EP 05 76 8197, Nov. 30, 2009.

Fazal et al., "Tackling Security Vulnerabilities in VPN-based Wireless Deployments," *Proceedings of 2004 IEEE Conference on Wireless Communications and Networking*, vol. 1, No. 20, Jun. 2004, pp. 100-104.

"The Wireless Wizards: Preventing Crosstalk from Wired to Wireless," Apr. 30, 2004.

* cited by examiner

NETWORK SECURITY ENHANCEMENT METHODS, APPARATUSES, SYSTEM, MEDIA, SIGNALS AND COMPUTER PROGRAMS

CROSS-REFERENCE TO RELATED APPLICATIONS

This application is a national phase entry under 35 U.S.C. 371 of International Application No. PCT/CA2005/001130, filed Jul. 19, 2005, and claims priority under 35 U.S.C. 365(b) from Canadian Patent Application No. 2,496,939, filed Feb. 8, 2005. This application also claims the benefit under 35 U.S.C. 119(e) of U.S. Provisional Application No. 60/653,608, filed Feb. 16, 2005.

FIELD OF INVENTION

This invention relates to methods, apparatuses, systems, computer programs, computer-readable media and signals for enhancing network security.

BACKGROUND

Millions of computers now being sold are equipped with both a wireless network interface for establishing a wireless network connection, and a wired network interface for establishing a wired network connection. Such computers are quickly becoming a serious security threat to secure wired networks, since they are potentially capable of wirelessly broadcasting access to the secure wired networks to which they are connected. Unfortunately, access to the wired network may be broadcast unintentionally to unauthorized and potentially undetected users outside the premises in which a secure wired network is located.

For example, when a user connects a wireless-equipped computing device such as a laptop computer to a company's wired network, unknown to the user, but not uncommonly, the wireless network equipment on the laptop may be configured to automatically try to connect to one or more default or pre-configured trusted wireless access points. However, a hacker may be able to spoof (i.e., to pretend to be) such a trusted wireless access point from a mobile wireless-equipped computer at a nearby location, e.g., in a car parked nearby. If a wireless connection is established by the user's laptop to the fake access point, the hacker may now be able to "tunnel through" the fake access point to access shared documents and resources on the user's laptop or the wired company network. Furthermore, the hacker may be able to introduce viruses, keystroke loggers and other forms of destructive software onto the user's laptop or even the company's wired network. Similarly, the user's laptop computer may be configured to automatically connect to another type of trusted wireless network (such as a mobile ad hoc wireless network), but may instead connect to a hacker network that is pretending to be the trusted wireless network, thereby exposing the user's computer and the company's wired network to unauthorized access without the user knowing it. Wireless networking thus exposes mobile computers and secure wired networks to a type of wireless phishing attack, which may be referred to as Wi-phishing.

Many existing wireless security solutions focus on encrypting wireless connections and/or establishing a robust firewall against hostile attacks. These approaches, however, do not adequately address the security risks engendered by a hacker posing as a trusted wireless access point or network.

SUMMARY OF THE INVENTION

In accordance with a first aspect of the invention, there is provided a method of enhancing network security. The method includes causing a wireless network interface of a computing device to be disabled, in response to detection of a network connection between the computing device and a wired network.

Advantageously, causing the wireless network interface of the computing device to be disabled whenever the user connects the computing device to the wired network reduces the risk that the user's computing device will inadvertently wirelessly re-broadcast an authorized connection to the wired network to unauthorized users, such as hackers posing as a trusted wireless access point, for example. Consequently, hackers should ordinarily be prevented from "tunnelling through" the wireless interface(s) of the user's computing device to reach shared documents and resources on the user's computing device and on the wired network to which the user's computing device is attached.

The method may involve detecting the presence of one or more network interfaces from among of the computing device, and may further involve identifying wired and wireless network interfaces from among the one or more detected network interfaces.

The method may further involve detecting the network connection. This may involve monitoring Windows™ Management Instrumentation (WMI) Network Driver Interface Specification (Ndis) events. Monitoring WMI Ndis events may include detecting "connect", "disconnect", "arrival" and "removal" events, which in turn may involve receiving MSNdis_StatusMediaConnect, MSNdis_StatusMediaDisconnect, MSNdis_NotifyAdapterArrival and MSNdis_NotifyAdapterRemoval events respectively through a IWbemObjectSink sink interface of Windows™.

Causing the wireless network interface to be disabled may include making calls to a SetupAPI block of Windows™

The method may further include verifying that the wireless network interface was successfully disabled.

The method may further include detecting a disconnection of the wired network connection. Detecting the disconnection may include detecting a "disconnect" or "removal" event.

The method may further include causing the wireless network interface to be enabled in response to the disconnection.

The detection of the network connection may include detection of a network connection between a wired network interface of the computing device and the wired network.

The method may further include notifying a user of disablement of the wireless network interface.

Identifying may include identifying the wired and wireless network interfaces from among the one or more detected network interfaces in response to a network adapter arrival event.

Identifying wireless network interfaces may include determining whether a particular wireless network interface is associated with at least one predefined attribute indicative of a wireless network interface.

Identifying wireless network interfaces may further include determining whether a particular wireless network interface supports a 802.11 service set object identifier (OID).

The method may further include, in response to detecting that the wireless network interface failed to be disabled, taking corrective action and then attempting again to disable the wireless network interface. Taking corrective action may include causing incorrect registration information relating to the wireless interface to be corrected in an operating system registry.

Causing may include calling a device installation function to cause the wireless network interface to be disabled.

Detecting the network connection may include using an adapter display name associated with a wired network interface of the computing device to register a Windows Management Instrumentation (WMI) sink interface to receive notifications of Ndis events relating to the wired network interface.

Causing the wireless network interface to be disabled may further include using a hardware identifier associated with the wireless network interlace as a parameter to a device installation function operable to disable the wireless network interface.

Detecting the disconnection may include checking connection status for all wired interfaces detected as being installed in the system, and determining that none of the detected wired interfaces has a network connection with a wired network.

Causing the wireless network interface to be disabled may include causing the wireless network interface to be inoperable.

Causing the wireless network interface to be disabled may include implementing an operating system service.

In accordance with another aspect of the invention, there is provided a method of controlling network access in a system. The method involves receiving a first list identifying one or more wireless network interfaces installed in the system and each operable to establish a wireless connection to a respective network, and receiving a second list identifying one or more wired network interfaces installed in a system and each operable to establish a wired connection to a respective network. The method further involves detecting a wired connection to a network through one of the wired network interfaces, and in response to detection of the wired connection, disabling the wireless network interfaces to prevent any wireless connections being established therethrough.

The method may further involve processing an original list identifying network interfaces installed in the system, to produce the first and second lists.

In accordance with another aspect of the invention, there is provided an apparatus for enhancing network security. The apparatus includes a processor circuit configured to cause the methods described herein to be carried out.

In accordance with another aspect of the invention, there is provided an apparatus for enhancing network security. The apparatus includes means for carrying out the various functions disclosed herein.

In accordance with another aspect of the invention, there is provided a computer-readable medium storing instruction codes for directing a processor circuit to cause the methods described herein to be carried out.

In accordance with another aspect of the invention, there is provided a system for enhancing network security. The system includes a computing device comprising a wireless network interface and a processor circuit. The processor circuit is configured to cause the wireless network interface to be disabled, in response to detection of a network connection between the computing device and a wired network.

The processor circuit may be configured to cause the various method steps described herein to be carried out.

In accordance with another aspect of the invention, there is provided a computer-readable signal, which may be embodied in a communications medium. The signal includes instruction codes for directing a processor circuit to cause the methods described herein to be carried out.

In accordance with another aspect of the invention, there is provided a computer program including code means that when executed by a processor circuit cause the various steps described herein to be carried out.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
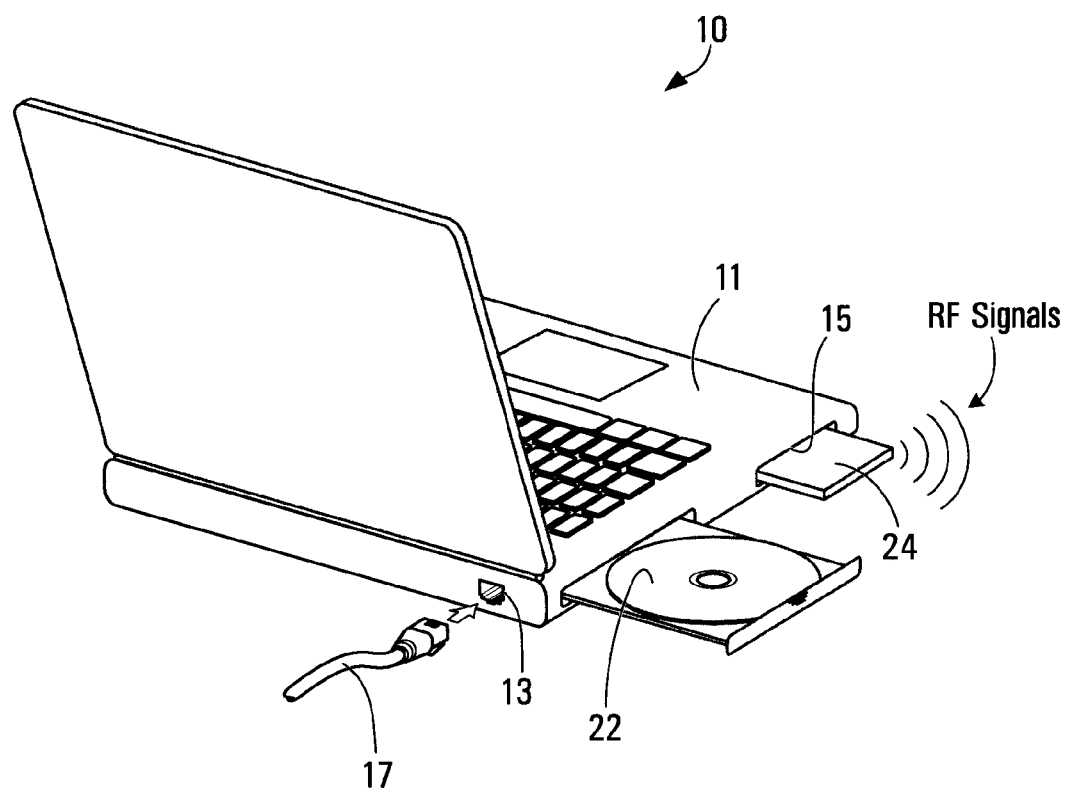
FIG. 1 is a perspective view of a system for enhancing network security according to a first embodiment of the invention, including a computing device that includes both a wired network interface and a wireless network interface.
Figure 2:
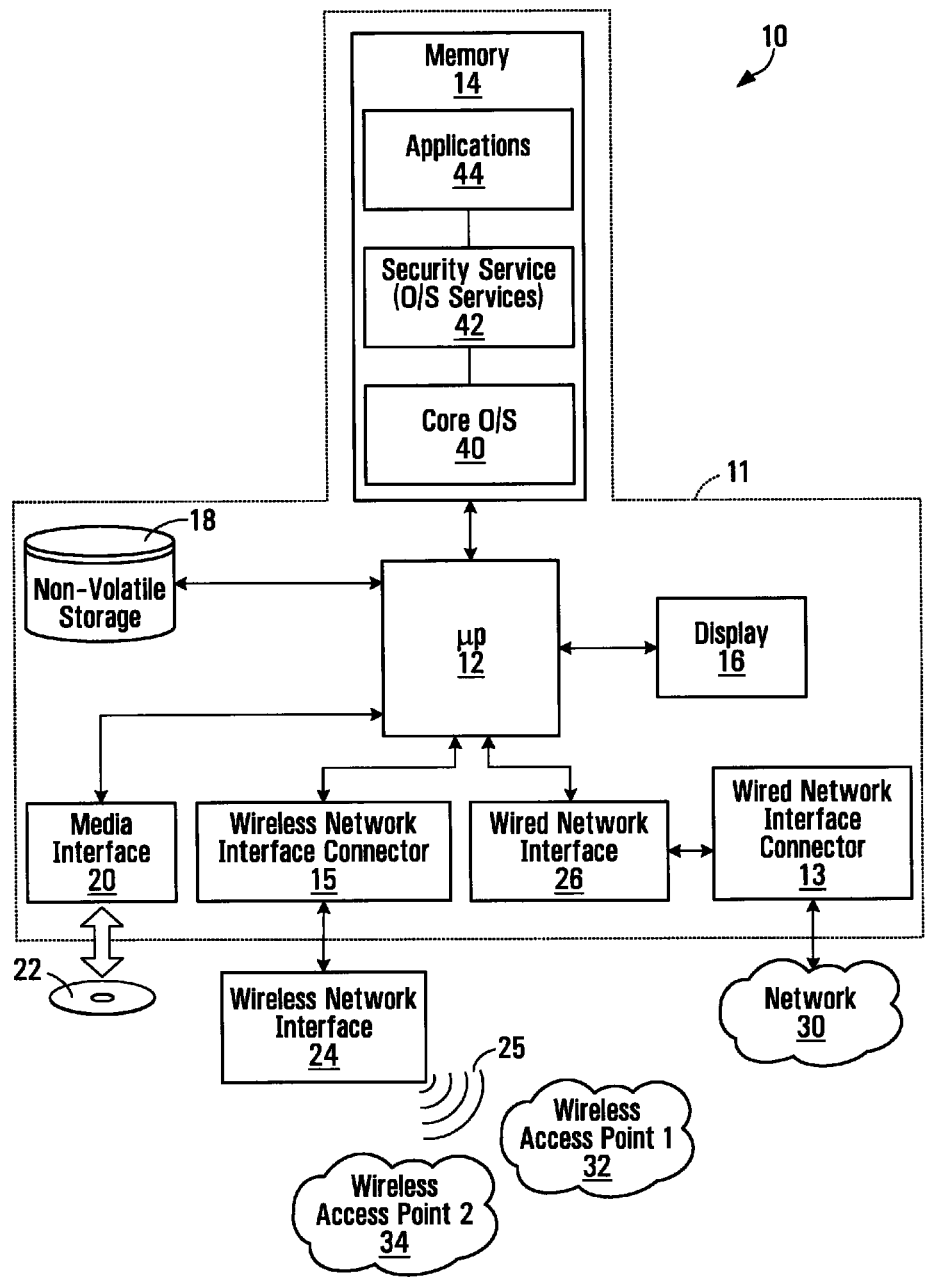
FIG. 2 is a block diagram of the system shown in FIG. 1, showing a memory and a processor circuit of the computing device.

Referring to FIGS. 1 and 2, a system for enhancing network security according to a first embodiment of the invention is shown generally at 10. In this embodiment, the system 10 includes a computing device 11, which in turn includes a wireless network interface and a processor circuit 12. The processor circuit 12 is configured to cause the wireless network interface to be disabled, in response to detection of a network connection between the computing device and a wired network 30.

In this embodiment, the computing device 11 includes a laptop computer. Alternatively, any other computing device capable of communication with both a wireless network and a wired network may be substituted. For example, the computing device 11 may include other portable computing devices such as personal digital assistants, or non-portable computing devices such as desktop computers. These and other examples of computing devices will be apparent to one of ordinary skill in the art upon review of the present specification.

In this embodiment, the wireless network interface of the computing device 11 includes a wireless network interface connector 15 and a wireless network interface adapter 24 connectable thereto. Alternatively, however, other types of wireless network interfaces may be substituted. Thus, in the present embodiment, causing the wireless network interface to be disabled may include causing either the connector 15 or the adapter 24, or both, to be disabled.

Similarly, in this embodiment the computing device 11 includes a wired network interface. More particularly, in this embodiment the wired network interface includes a wired network interface connector 13 and a wired network interface adapter 26. In the present embodiment, the wired network interface connector 13 is operable to connect through a network cable 17 to a wired local area network (LAN) operating according to an Ethernet specification, for example. Alternatively, other types of wired network interfaces may be substituted.

Referring to FIG. 2, a block diagram of the system 10 and the computing device 11 is shown. Although various elements are depicted in FIG. 2 as being either internal or external to the computing device 11, it will be appreciated that in other embodiments, components shown as internal to the computing device 11 may be replaced with external components, or vice versa.

In this embodiment, the computing device 11 includes the processor circuit 12, which is in data communication with a memory 14, a display 16, a non-volatile storage device 18, a media interface 20, the wireless network interface connector 15, and the wired network adapter 26 connected to the wired network interface connector 13. In the embodiment shown, the wireless network interface adapter 24 is received in the wireless network interface connector 15 and is thereby connected to and in communication with the processor circuit 12.

The non-volatile storage device 18 may include a local hard drive, for example. The media interface 20 may include a CD-ROM drive or a flash memory card reader. The non-volatile storage device 18 and the media interface 20 are operable to read a computer-readable medium 22 encoded with instruction codes for directing the processor circuit 12 to execute applications and perform methods described herein according to the present embodiment of the invention.

In this embodiment, the wireless network interface includes the wireless network interface adapter 24, which in the present embodiment is operable to establish a wireless network connection by wirelessly connecting to one or more other computers or computing devices having wireless network interfaces and comprising a mobile ad hoc network, or by wirelessly connecting through one or more wireless access points, such as 32 or 34, to a respective wired or wireless network connected thereto, for example. This may involve connecting via wireless signals 25 such as radio-frequency (RF) signals. The wireless network connection may be established using the well-known IEEE 802.11a, 802.11b, or 802.11g wireless network standards, for example.

In this embodiment, the wired network interface includes the wired network interface adapter 26, which in this embodiment is operable to establish a network connection by a signal transmitted through one or more wires, such as the network cable 17, to a wired network 30 such as a local area network (LAN), which may be based on the Ethernet specification, for example.

The system 10 is operable receive a computer-readable signal encoded with instruction codes for directing the processor circuit 12 to execute methods described herein. Such a computer-readable signal encoded with instruction codes may be received through the wired or wireless interface adapters (26 or 24), for example, and decoded by the respective interfaces for use by the processor circuit 12.

In this embodiment, the memory 14 stores codes for directing the processor circuit 12 to provide core operating system (OS) 40 functions, security service 42 functions, and application 44 functions.

Operating System 40

Figure 3:
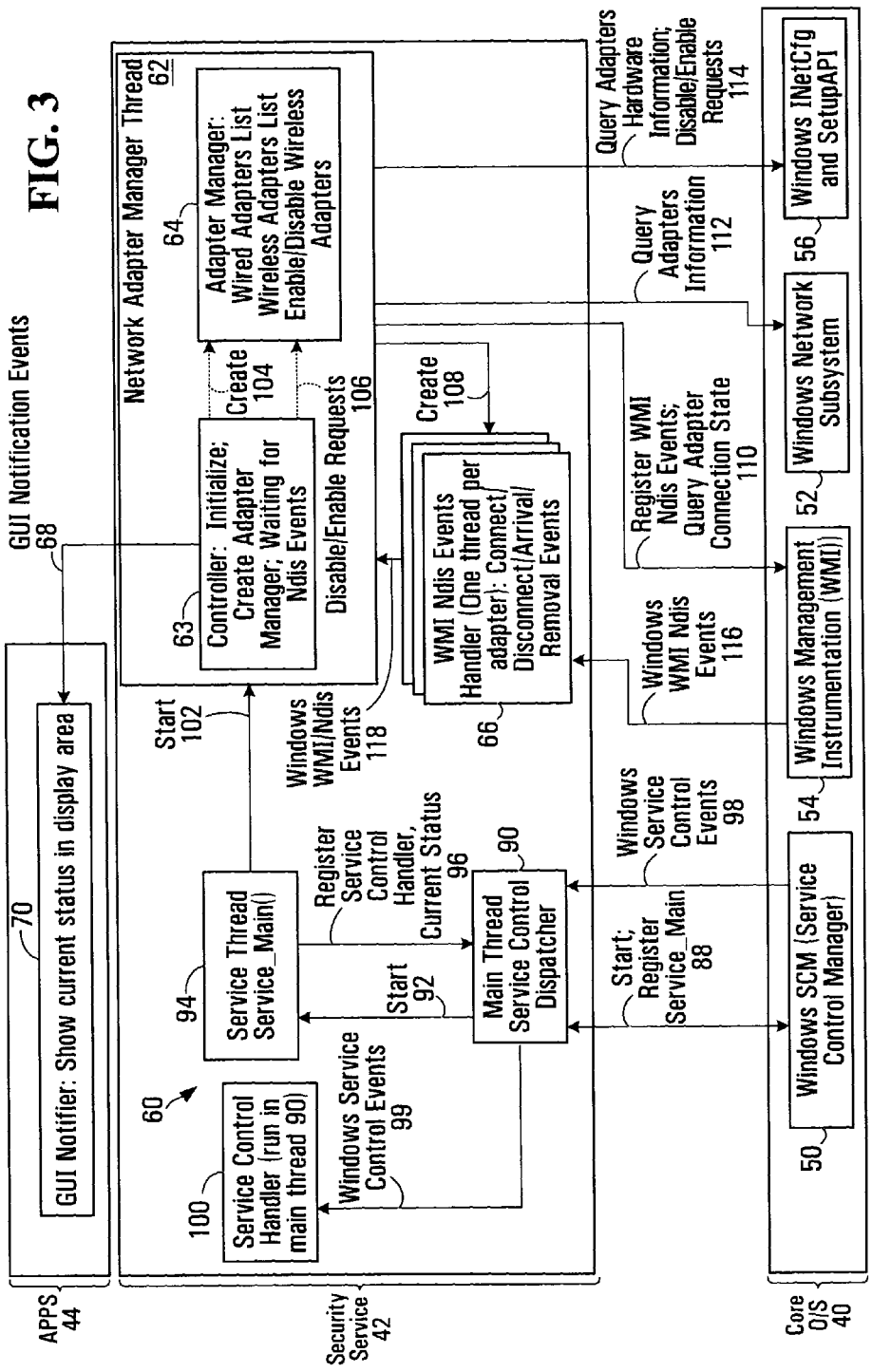
FIG. 3 is a block diagram showing a detailed view of blocks of code and threads of execution relating to a security service shown in FIG. 2.

Referring to FIG. 3, in the present embodiment, the core operating system 40 includes a version of the Windows™ operating system such as Windows XP™ or Windows 2000™. Blocks of interest in the operating system 40, in this embodiment, include a Windows™ Service control manager (SCM) block 50, a Windows™ Network subsystem block 52, a Windows™ Management Instrumentation (WMI) block 54, and an InetCfg and SetupAPI block 56, with respective functionality as is generally known in the art of Windows™ programming. Effectively, blocks 50, 52, 54 and 56 are subsystems of the operating system 40. Each of these blocks has its own programming interfaces and conventions, as defined in various Microsoft Windows™ specifications, that define how other program blocks can interact with these blocks. A brief description of blocks 50, 52, 54 and 56 will now be provided.

The Service control manager (SCM) 50 facilitates user control of OS services installed in the system 10. The SCM 50 includes a services database (not shown) storing information about installed operating system services, including information on how each service should be started. The SCM 50 provides interfaces for installing, deleting, opening, enumerating, starting and stopping services registered in the services database. The SCM 50 also transmits service control events or requests to running services.

The Windows™ Management Instrumentation (WMI) block 54 provides access to information about operating system objects. The WMI block 54 is operable to provide notifications of special predefined hardware and software events to operating system services, such as the security service 42 of the present embodiment, by signaling the occurrence of these events. For example, WMI 54 can signal connect, disconnect, arrival and removal events pertaining to wired or wireless adapters installed in the system 10.

The Windows™ Network subsystem 52 maintains information relating to network interfaces of the system 10, including configuration information relating to any wired or wireless adapters installed in the system 10.

The InetCfg and SetupAPI block 56 provides programming interfaces for facilitating network device installation and control, including programming interfaces for disabling and enabling network adapters.

Security Service 42

The security service 42 includes a plurality of blocks of codes for directing the processor circuit 12 to effect various processes of the present embodiment of the invention. These blocks include an initialization and set up block 60, a network adapter manager block 62 (in this embodiment, associated with a network adapter manager object) and a network device interface specification (Ndis) events handler block 66.

In this embodiment, the security service 42 is implemented as an operating system service, namely, a Windows™ Service. The blocks of code associated with the security service 42 interact and cooperate with the various blocks of code associated with the core Windows™ operating system 40 to direct the processor circuit 12 to effect the functionality of this embodiment. Effectively, disabling and enabling wireless network interfaces in this embodiment involves implementing an operating system service.

In this embodiment, the initialization and setup block 60 includes a service control dispatcher thread 90 for executing codes associated with a _tmain( ) function, a service main thread 94 including a call back function entitled Service_Main( ), and a service control handler 100, which is a call back function associated with the service control dispatcher thread 90. The network adapter manager thread 62 includes a network adapter controller 63 and a network adapter manager 64 for managing network adapters installed in the system 10. The Ndis events handler 66 includes a plurality of threads for monitoring Ndis (i.e., Network Driver Interface Specification) events 116 signalled by Windows™ Management Instrumentation (WMI) 54. The Ndis events handler 66 sends Ndis event indications 118 to the network adapter controller 63 in response to detection of certain physical hardware or software "events". Ndis events of particular interest in this embodiment include the following:

1. MSNdis_NotifyAdapterRemoval: signaled by the processor circuit 12 under the direction of the WMI block 54 when a network adapter is disabled, uninstalled or physically removed from the system 10 (also referred to as an "Ndis removal event");
2. MSNdis_NotifyAdapterArrival: signaled by the processor circuit 12 under the direction of the WMI block 54 when a network adapter is enabled or inserted into the system 10 (also referred to as an "Ndis arrival event");
3. MSNdis_StatusMediaConnect: signaled by the processor circuit 12 under the direction of the WMI block 54 when a network adapter establishes a network connection, for example, when a network cable is plugged in to an Ethernet port (i.e., a type of "wired network connection") or a wireless network interface card comes into range of a wireless network access point and establishes a connection therewith (i.e., a type of "wireless network connection"); such an event may be referred to as an "Ndis connect event"; and
4. MSNdis_StatusMediaDisconnect: signaled by the processor circuit 12 under the direction of the WMI block 54 when a network adapter is disconnected, for example, when the network cable is unplugged from the Ethernet port, or the wireless network interface card moves out of range of the network access point (i.e., an "Ndis disconnect event").

This embodiment of the security service 42 directs the processor circuit 12 to monitor Windows Management Instrumentation (WMI) Ndis events, to detect and respond to the above-mentioned connect, disconnect, arrival and removal events. Responding to these events may involve causing one or more wireless network interfaces to be disabled or enabled as described herein.

Applications 44

The applications 44 in this embodiment include a Graphic User Interface (GUI) Notifier 70 application which directs the processor circuit 12 to update a status display in a graphical user interface (GUI) of the system 10 in response to notifications 68 received from the network adapter controller 63 of the security service 42.

In this embodiment, the GUI notifier 70 directs the processor circuit 12 to cause various icons to be displayed in a taskbar of the display 16. The icons correspond to respective notifications from the network adapter controller 63, that, for example, all wireless adapters have been enabled, all wireless adapters have been disabled, no wireless adapters were available to enable/disable, an attempted enable operation failed, or that an attempted disable operation failed.

Installation of the Security Service 42

In this embodiment, blocks of code for directing the processor circuit 12 to carry out methods described herein, are installed as a custom Windows™ operating system (OS) security service 42. This security service 42 may be installed by the processor circuit 12 under the direction of installation code embodied in an installation tool, or alternatively, may be built into the service itself and invoked by the user such as by running an executable file embodying the service with specific command line options such as -i to install.

In order to install the security service 42 within the Windows™ operating system, information about the security service is provided by the installation code to the Service control manager (SCM) block 50 for storage in a SCM services database (not shown). The services database is represented in Windows™ by a container object which holds a plurality of service objects.

To establish an initial connection to the Service control manager (SCM) block 50 and open its associated services database, the installation code directs the processor circuit 12 to call a Windows™ OpenSCManager( ) service function of the SCM block 50 to make a request for full access rights to the services database. If the call is successful, the processor circuit 12 causes the operating system to return to the installation code, a services database handle (i.e., a type of pointer) representing the SCM services database that was opened. The services database handle effectively identifies the SCM container object representing the SCM services database on a specific computer or computing device.

In this embodiment, the installation code directs the processor circuit 12 to call a CreateService( ) function of the SCM block 50, passing, as a parameter, the services database handle returned by the OpenSCManager( ) function, together with other parameters including: a string representing the name of the security service 42 to install; a display name (string) to be used to identify the security service 42; an indicator of the type of access desired to the security service 42; a parameter indicating the type code for the service; a security service start parameter indicating that the security service 42 should be started automatically by the service control manager (SCM) 50 during system startup; an error control parameter indicating what action should be taken if the security service 42 fails to start; a string containing a location (i.e., complete path) of an executable file for the security service 42; and an array representing the names of other services that the operating system must start before the security service 42 (in this embodiment, "WINMGMT", the Windows™ Management service). All this information is stored by the Windows™ SCM 50 in the SCM services database.

To open the security service 42 for access, the Windows™ OpenService( ) function is called with parameters identifying the security service, including the service database handle returned from OpenSCManager( ) a string representing the name of the security service 42, and an access parameter indicating desired access rights to the security service 42. If the processor circuit 12, under the direction of the SCM 50 block, successfully locates the security service 42 in the SCM services database, a service handle (i.e., pointer) representing the security service 42 is returned from the OpenService( ) function. This service handle is operable to be used as a parameter in calls to other service functions to effect various operations in respect of the security service 42. For example, to uninstall the security service 42, uninstall code directs the processor circuit 12 to call the DeleteService( ) function with the security service handle as a parameter.

Signaling the Occurrence of Hardware/Software Events

In the present embodiment, which utilizes multiple processes or threads of execution, the operating system directs the processor circuit 12 to notify certain processes or threads about particular changes of state which have occurred in other processes or threads or in hardware devices. Such changes of state may be reflected in a change to a stored value or signal, for example, representing some condition. Changes to such values or signals are often created by detecting a physical event, for example, in the case of a hardware device, or by changing a value or signal in response to a software process. Regardless of how the value or signal is changed, the fact that it has changed means there is a change of state of the system in response to either a hardware or software source. Such change of state may be referred to as an event.

Processes running on the processor circuit 12 may be started, resumed, altered or stopped in response to an event and thus processes may be referred to as being event-driven.

Events, whether originating from a change in the state of hardware or software, may be represented in the Windows™ operating system as event objects. For example, an event object may be created by calling a CreateEvent( ) function of the Windows™ operating system. An event object is a representation of an event and this representation may have a state indicating whether or not the event object has been communicated to another process or thread running on the processor circuit 12. A successful call to the CreateEvent( ) function returns a handle to the created event object, and this handle may be used by other functions and procedures to affect the state of the event object. The SetEvent( ) and ResetEvent( ) functions of Windows™, when called with an event handle of an event object, set or reset the state of the event object to signalled or not signalled, respectively.

Various processes and threads running in the operating system 40 may detect changes to the state of an event object and respond to it in a number of ways. For example, a thread may directs the processor circuit 12 to call WaitForSingleObject( ) a blocking Windows™ function which returns only when a specified object is in a particular state (or a specified timeout interval elapses), in order to suspend itself until a specified event object state occurs. Similarly, in this embodiment, a thread may directs the processor circuit 12 to respond to the state of one or more event objects by calling the WaitForMultipleObjects( ) function, to suspend the thread until any one of the specified objects is in the signaled state, or a certain time-out interval elapses. Event objects may have various attributes depending on the parameters sent to the CreateEvent( ) function.

Starting the Security Service 42

In this embodiment, the Windows™ operating system 40 directs the processor circuit 12 to start the GUI notifier application 70 when the system 10 is booted up, whereupon it creates a thread. Within this created thread, the GUI notifier application 70 calls the WaitForMultipleObjects( ) function is called to wait for global GUI notification events 68.

The security service 42 is started by calling an executable file associated with the security service 42. In the present embodiment, the security service 42 is installed as an automatically starting service, therefore its executable file is automatically called when the system 10 boots up. When the executable file is run, the security service 42 causes a main service control dispatcher thread 90 to begin executing a function called _tmain( ) on the processor circuit 12. The service control dispatcher thread 90, causes the processor circuit 12 to configure the SCM block 50 to signal Windows™ service control events 98 to the appropriate call back function, as will now be described.

Immediately after it is established, the service control dispatcher thread 90 directs the processor circuit 12 to call the Windows™ function StartServiceCtrlDispatcher( ) to register with the service control manager (SCM) 50 a main call back function entitled Service_Main( ) as the starting point of services. Once the Service_Main( ) function is registered, the Windows™ SCM 50 directs the processor circuit 12 to send a service start request to the service control dispatcher thread 90, which in response causes the Service_Main( ) function to direct the processor circuit 12 to establish the Service_Main thread 94. The call to the StartServiceCtrlDispatcher( ) function does not return until the security service 42 is stopped. When the StartServiceCtrlDispatcher( ) function call finally does return, the service control dispatcher thread 90 will be terminated.

Service_Main( ) Thread 94

When the Service_Main( ) thread 94 is started, it immediately directs the processor circuit 12 to call a RegisterServiceCtrlHandlerEx( ) function of the Windows™ SCM 50 to register a "handler" callback function of the security service 42 for handling service control requests 98 from the Windows™ SCM 50. In the present embodiment, the handler callback function is provided by a service control handler block entitled Service_Ctrl( ) 100, run in the same thread as the service control dispatcher 90.

The RegisterServiceCtrlHandlerEx( ) function directs the processor circuit 12 to return a handle to a service status information structure, comprising a plurality of fields for informing the service control manager (SCM) 50 about the current configuration and state of the security service 42. A SetServiceStatus( ) function of the service control manager 50 may be used to update the fields in the service status information structure. Fields of interest in this embodiment include a service type field, a current state field, and a controls accepted field. The service type field is used to represent the type of the security service 42; the current state field represents an operational state of the security service, (e.g., whether the security service is started, stopped, or about to start or stop); and the controls accepted field represents the kinds of notifications (i.e., service control event signals 98) that the security service 42 is able to accept from the service control manager 50 and process in its service control handler 100.

In this embodiment, the Service_Main( ) thread 94 initially directs the processor circuit 12 to call the SetServiceStatus( ) to set the service type field, controls accepted field and current state field as follows. The service type field is set to SERVICE_WIN32_OWN_PROCESS, a predefined value indicating that the security service 42 runs in its own process. The current state field is initially set to SERVICE_START_PENDING to indicate that security service 42 is starting. The controls accepted field is set to SERVICE_ACCEPT_STOP or SERVICE_ACCEPT_SHUTDOWN, to indicate that the security service 42 is able to receive and process notifications of the following service control events from the SCM 50: SERVICE_CONTROL_STOP (indicating that the security service should stop), and SERVICE_CONTROL_SHUTDOWN (indicating that system shutdown is occurring and therefore the security service should shut down too). When a notification of either one of these service control events is signalled (98) to the service control handler 100, the Service_Main( ) thread 94 cleans up by releasing acquired resources, calls SetServiceStatus( ) to set the current service status to SERVICE_STOPPED, and terminates.

After these calls, the Service_Main( ) thread (94) directs the processor circuit 12 to call a CreateThread( ) function of Windows™ to create a network adapter manager thread 62 (described in detail below), thereby marking the end of service initialization. The Service_Main( ) thread (94) then directs the processor circuit 12 to call the SetServiceStatus( ) function with a dwCurrentState value of SERVICE_RUNNING, thus indicating to the Windows™ SCM 50 that the security service 42 is running. The Service_Main( ) thread 94 also directs the processor circuit 12 to call a CreateEvent( )

function of Windows™ to create an unnamed manually resettable event object, which may be referred to as a "stop event object", having an initial non-signalled state. A successful call to the CreateEvent( ) function directs the processor circuit 12 to return a handle to the stop event object.

As mentioned above, various threads of the security service 42 direct the processor circuit 12 to set the state of an event object to a signalled state by calling a Windows™ SetEvent( ) function with the handle of the event object as a parameter. Similarly, the various threads may direct the processor circuit 12 to monitor the state of the event object, therefore event objects are used among the various threads of the security service 42 as a kind of synchronization mechanism.

To synchronize itself with other threads, the Service_Main( ) thread (94) directs the processor circuit 12 to call WaitForSingleObject( ) a blocking Windows™ function which directs the processor circuit 12 to return only when a specified object is in a particular state (or a specified timeout interval elapses). In this embodiment, the WaitForSingleObject( ) function is called with parameters indicating that the Service_Main( ) 94 should await an internal "stop" event signal, or else timeout within a predefined period of time such as 1000 milliseconds, for example. When the stop event object state becomes set, the Service_Main( ) thread 94 effectively detects that an internal "stop" event has been signalled.

In this embodiment, the security service 42 may detect and respond to either an external event (e.g., one signalled by the SCM 50 through a control event, e.g., SERVICE_CONTROL_SHUTDOWN, sent to the service control handler 100: see at arrows 98 and 99; a description of how the present embodiment detects and responds to WMI 54 Ndis events, is provided below), or else an internal event (i.e., as signalled by an internal thread of the security service 42 which sets a user-defined event object, such as the stop event object, to a signalled state).

Once the service control handler 100 has been registered under the direction of the Service_Main( ) thread 94, Windows™ service control event signals 98 are passed by processor circuit 12, under the direction of the Windows™ SCM 50, to the service control dispatcher 90. The service control dispatcher 90 in turn directs the processor circuit 12 to dispatch the service control events to the service control handler 100, as indicated by arrow 99. In this embodiment, service control event signals 98 are dispatched to the service control handler 100 when the SCM 50 directs the processor circuit 12 to call a Windows™ HandlerEx( ) function with a dwControl parameter representing the control code of the event to be handled (e.g., SERVICE_CONTROL_STOP).

Stopping the Security Service 42

In this embodiment, the security service 42 ignores events other than certain predefined Windows™ service control events including the SERVICE_CONTROL_STOP and SERVICE_CONTROL_SHUTDOWN events. When the Windows™ SCM 50 directs the processor circuit 12 to signal the occurrence of either of these two events (98), the service control handler 100 directs the processor circuit 12 to set the stop event object to a signalled state using the Windows™ SetEvent( ) function, thereby indicating the occurrence of an internal stop event. In general, all threads relating to the security service 42 are blocked waiting for a status change of the stop event object (e.g., using WaitForSingleObject( ) or WaitForMultipleObjects( ), therefore an internal stop event will cause each of these threads to cleanup (e.g., deallocate all held resources) and terminate. After all other threads of the security service 42 are terminated, the service control dispatcher thread 90 will also terminate, whereupon the security service stops running. (The Windows™ SCM 50 may later directs the processor circuit 12 to restart the service in response to receipt of a start request from the user, for example.)

Network Adapter Manager Thread 62

As mentioned above, instruction codes in the Service_Main( ) thread 94 direct the processor circuit 12 to create the network adapter manager thread 62 when the security service 42 initially starts up. In this embodiment, the network adapter manager thread 62 directs the processor circuit 12 to execute instruction codes associated with a network adapter controller block 63 and a network adapter manager block 64, both shown in FIG. 3. In this embodiment, the network adapter manager block 64 is implemented in an instance of a custom class (i.e., an object) created by block 63.

Figure 4:
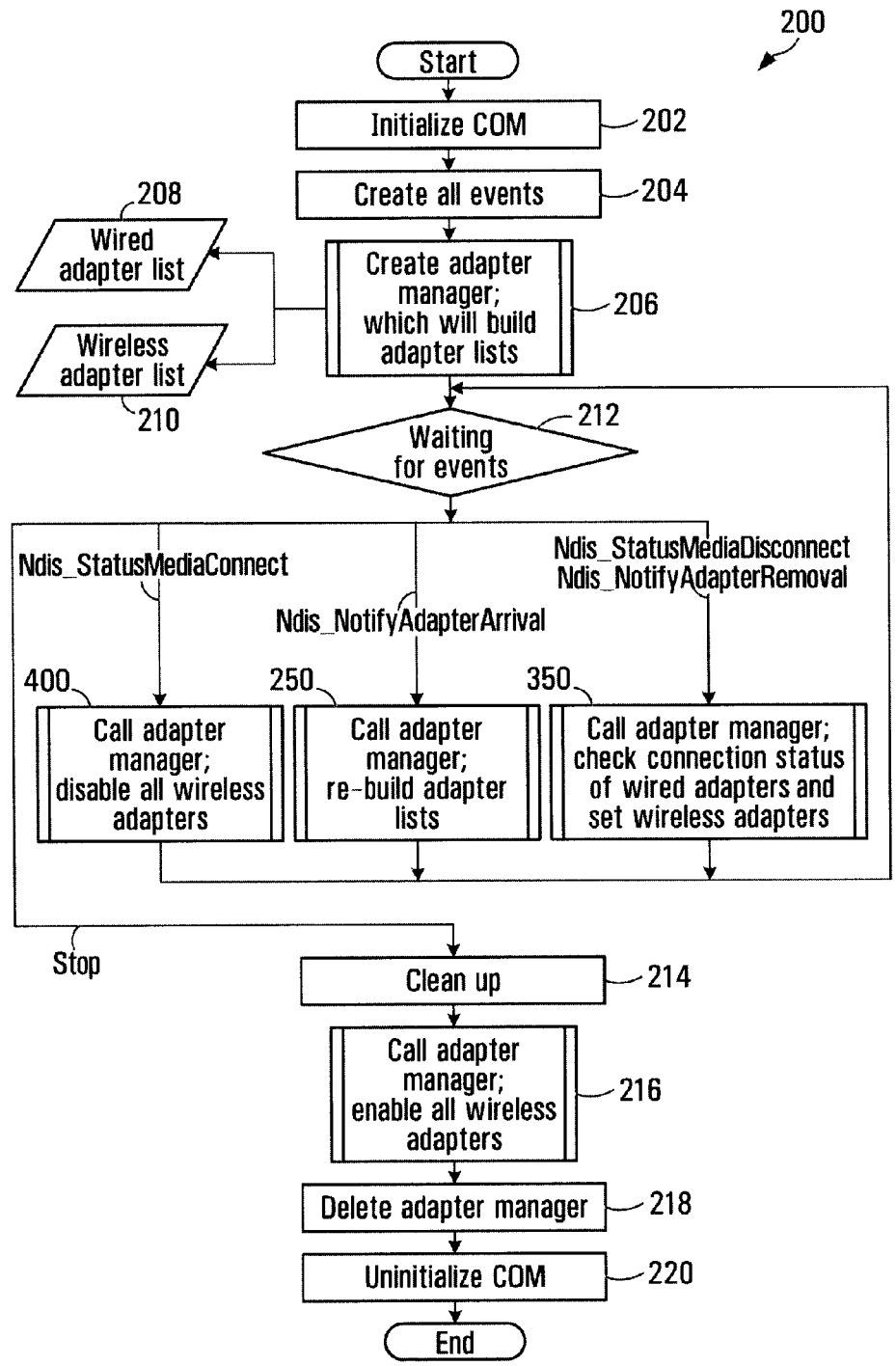
FIG. 4 is a flowchart illustrating various processes implemented by codes embodied in a network adapter controller block shown in FIG. 3, including startup initialization, setting up event notification, and responding to particular Ndis events and internal events including a stop event indicating shutdown of the security service.

FIG. 4: Network Adapter Controller

In FIG. 4, a flowchart representing blocks of code for directing the processor circuit 12 to implement the network adapter controller 63, is shown generally at 200.

Referring to FIGS. 3 and 4, when the network adapter manager thread 62 is started, the network adapter controller block 63 is started and block 202 thereof directs the processor circuit 12 to initialize a Windows™ Component Object Model (COM) library, which, under the Windows™ operating system, provides access to the Windows™ Management Instrumentation (or WMI) block 54. As is known in the art, the COM library is initialized by calling the Windows CoInitializeEx( ) and CoInitializeSecurity( ) functions, to setup a concurrency model, security configuration, authentication level, and other initialization options.

Block 204 then directs the processor circuit 12 to employ the CreateEvent( ) function of Windows™ to create a plurality of event objects for internal use by the security service 42, including all Network Driver Interface Specification (Ndis) and GUI notification event objects to be used. Parameters are passed to the CreateEvent( ) function to indicate the attributes of the event objects. Pointers to these events objects are put into an events array. Event objects may then be set to a signaled state by calls to the SetEvent( ) function or reset to a non-signaled state by calls to the ResetEvent( ) function of Windows™ The event objects created by block 204 in this embodiment include:

1. an internal stop event object for indicating that the security service 42 should shut down;
2. an adapter removal event object for indicating that a network adapter has been removed from or disabled in the system 10;
3. an adapter arrival event indicating that a network adapter has been installed or enabled in the system 10;
4. an adapter connect event object indicating that a network adapter has established a network connection (e.g., when a user plugs a LAN cable into an Ethernet cable receptacle); and
5. an adapter disconnect event object indicating that a network adapter of the system 10 has been disconnected from its network connection (e.g., when the user unplugs the LAN cable).

The event objects created in this embodiment also include five additional GUI notification event objects for signaling (68) that a status notification provided to the user by the processor circuit 12 under the direction of the GUI notifier 70, should be updated, including:

6. a wireless enabled event object for indicating that a wireless adapter was successfully enabled;
7. a wireless disabled event object for indicating that a wireless adapter was successfully enabled;

8. a no wireless adapters event object for indicating that no wireless adapters to enable/disable were found;
9. an enable failed event object for indicating that an attempted enable operation for a wireless adapter failed; and
10. a disable failed event object for indicating that an attempted disable operation for a wireless adapter failed.

Figure 5:
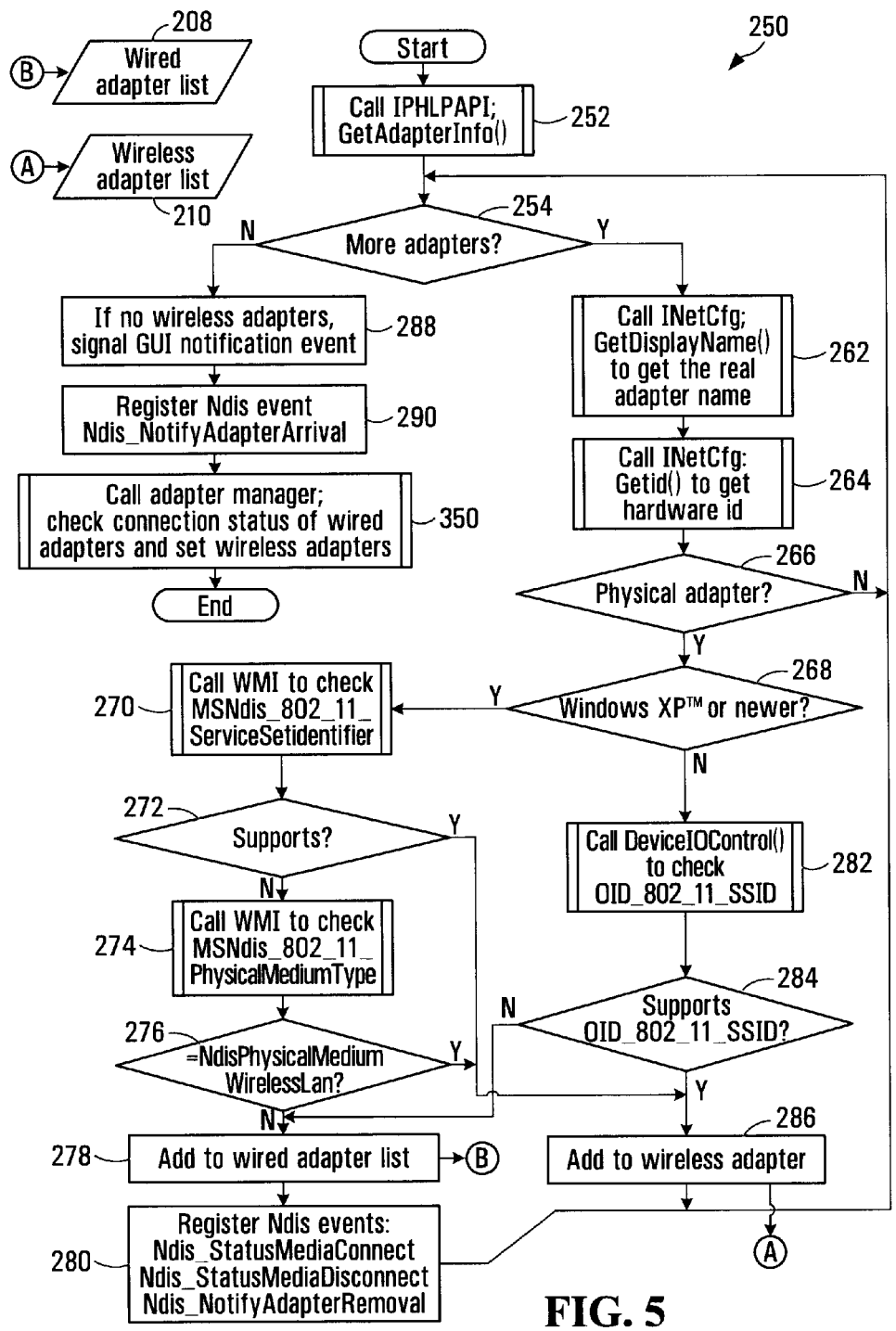
FIG. 5 is a flowchart illustrating a process, implemented by codes of a network adapter manager block shown in FIG. 3, for producing respective lists of wired and wireless adapters installed in the system shown in FIG. 1.

Once all the event objects have been created, block 206 directs the processor circuit 12 to call block 250 of the network adapter manager block 64, to build a wired adapter list 208 and a wireless adapter list 210, as shown in FIG. 5.

The network adapter controller block 63 directs the processor circuit 12 to wait for one of a plurality of predefined events to occur, as shown at block 212 in FIG. 5. Block 212 does this by directing the processor circuit 12 to call the WaitForMultipleObjects( ) function of Windows™ with parameters including an indication of the number of events to wait for, a pointer to the events array produced at block 206 representing a plurality of event objects to be monitored by the WaitForMultipleObjects( ) function, an indication that a change of state of even one event object is sufficient to trigger a return from the WaitForMultipleObjects( ) function, and a timeout value (e.g., 5000 ms). The WaitForMultipleObjects( ) function directs the processor circuit 12 to wait until any one of the specified event objects is in the signaled state or the time-out interval elapses.

The Ndis events handler 66 directs the processor circuit 12 to monitor WMI Ndis events 116 to detect the arrival of a network adapter in the system 10. When an MSNdis_NotifyAdapterArrival event signal is received from Windows™ Management Instrumentation (WMI) 54 by the WMI Ndis events handler 66, the arrival event object is signaled and block 250 directs the processor circuit 12 to rebuild the lists of wired and wireless network adapters 208 and 210 as described in FIG. 5.

The Ndis events handler 66 also directs the processor circuit 12 to monitor WMI Ndis events 116 to detect a disconnection of a network connection to a wired network adapter, or to detect removal of a network adapter from the system 10. When a MSNdis_StatusMediaDisconnect or MSNdis_NotifyAdapterRemoval event signal is received from the WMI block 54 by the WMI Ndis events handler 66, the disconnect event object is signaled and block 350 directs the processor circuit 12 to check the connection status of wired network adapters and to set the wireless adapter list 210 accordingly, as described in FIG. 6.

By directing the processor circuit 12 to monitor WMI Ndis events 116, the Ndis events handler 66 also detects a network connection being established to a wired network adapter of the system 10. When a MSNdis_StatusMediaConnect event signal is received from the WMI block 54 by the WMI Ndis events handler 66, the connect event object is signaled and block 400 directs the processor circuit 12 to disable all wireless adapters as described in FIG. 7.

When a GUI notification event signal occurs, as indicated by change of state of the GUI notification event object, block 222 directs the processor circuit 12 to inform the GUI notifier process 70, as shown by arrow 68 in FIG. 3.

When an internal stop event occurs, as signaled by a change of state of the stop event object, a series of steps are taken to shut down the security service in blocks 214, 216, 218 and 220. Block 214 directs the processor circuit 12 to cleanup resources allocated by the operating system 40, for example, by deallocating held resources such as memory space. Block 216 directs the processor circuit to invoke the network adapter manager block 64, which directs the processor circuit 12 to enable all wireless adapters in the system 10, as described in connection with FIG. 7. Finally, block 220 directs the processor circuit 12 to un-initialize the COM library by calling the CoUninitializeEx( ) command of Windows™. The network adapter manager thread 62 then terminates.

Network Adapter Manager Thread: Network Adapter Manager

Figure 6:
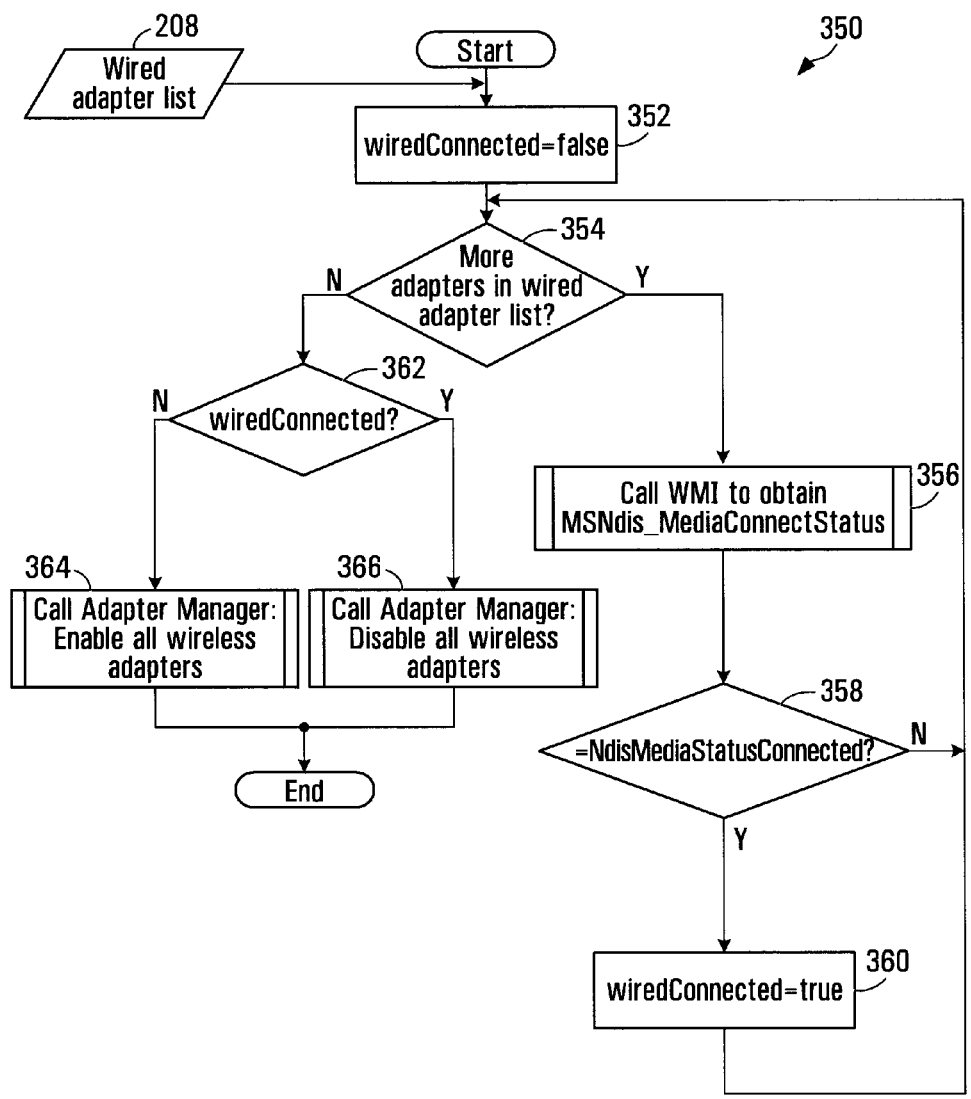
FIG. 6 is a flowchart illustrating a process, implemented by codes embodied in the network adapter manager block, for checking a connection status of the wired adapters in the wired adapter list and then enabling or disabling the wireless adapters in the wireless adapter list by the process shown in FIG. 7.
Figure 7:
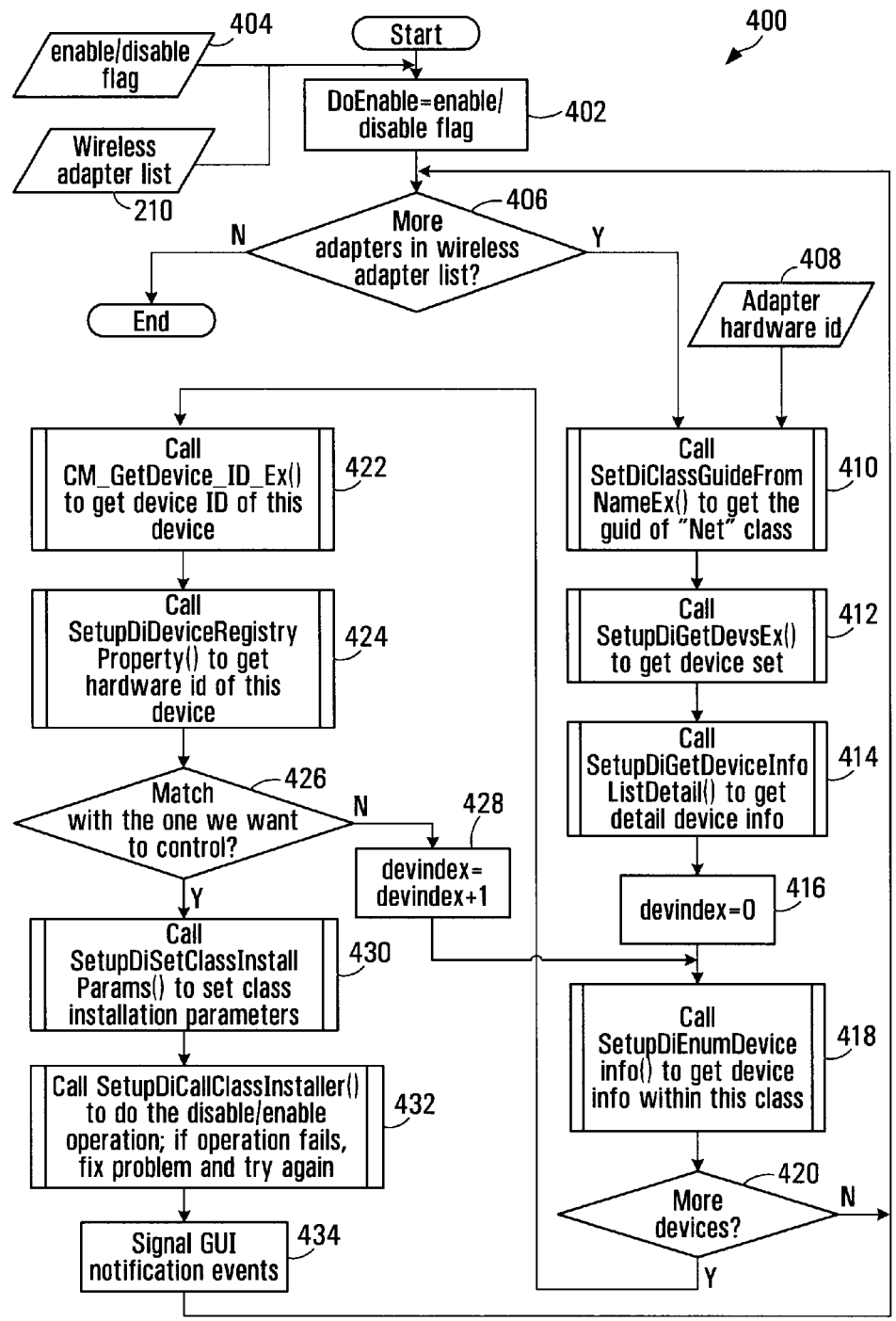
FIG. 7 is a flowchart illustrating a process, implemented by codes embodied in the network adapter manager block of FIG. 3, for disabling or enabling the wireless adapters in the list of wireless adapters produced by the process shown in FIG. 5.

In FIGS. 5, 6 and 7, flowcharts representing blocks of codes for directing the processor circuit 12 to implement the network adapter manager 64 of this embodiment, are shown generally at 250, 350 and 400, respectively. Generally, FIG. 5 illustrates a method for detecting the presence of one or more network interfaces in the system 10, and for identifying wired and wireless network interfaces from among the detected network interfaces. FIG. 6 illustrates a method of checking a connection status of all wired network adapters to detect the presence or absence of any wired network connections, and then, causing the wireless network interfaces of the system 10 to be either disabled or enabled, respectively, in response to detecting the presence or absence of at least one wired network connection between the system and a wired network 30. FIG. 7 illustrates a specific method for causing wireless network interlaces to be enabled or disabled.

FIG. 5: Identifying Wired and Wireless Network Adapters

As shown in FIG. 5, block 252 directs the processor circuit 12 to call a GetAdaptersInfo( ) function of a Windows™ Internet Protocol Helper API (IPHLPAPI), to retrieve information from the Windows™ network subsystem 52 about network interfaces (e.g., network adapters) currently installed in the system 10. IPHLPAPI is an Application Programming Interface (API) of Windows™ which allows applications to retrieve network configuration information relating to network adapters which are bound to the Transmission Control Protocol/Internet Protocol (TCP/IP). In the present case, the call to the GetAdaptersInfo( ) function detects and obtains information about all network adapters bound to TCP/IP in the system 10, thereby detecting the presence of one or more network interfaces of the computing device 11.

The call to the GetAdaptersInfo( ) function in block 252 directs the processor circuit 12 to return a pointer to a linked list of IP_ADAPTER_INFO structures, each containing information about a particular network adapter on the system 10. Each IP_ADAPTER_INFO structure in the linked list contains a plurality of information fields providing information about various attributes of a particular network adapter, including an adapter name field indicating a globally unique identifier (GUID) uniquely identifying each particular network adapter. Effectively, block 252 produces a list of network adapters detected as installed in the system 10.

It will be appreciated that while IPHLPAPI has been used in this embodiment to obtain a list of installed network adapters, in other embodiments, a different method of obtaining a list of network adapters installed in a system may be used, for example, calls to a different programming interface of the operating system 40. Also, while this embodiment focuses on controlling physical network adapters bound to TCP/IP, in other embodiments, it may be desirable to retrieve a list of network adapters bound to other networking protocols, such as those of the Novell NetWare protocol suite, for example, in order to monitor and control such network adapters.

At this point, in this embodiment, the list of network adapters does not necessarily represent physical (wired or wireless) network adapters of the system 10, since it includes virtual adapters as well. Moreover, the adapter names obtained by the call to the GetAdaptersInfo( ) function in block 252, do not necessarily correspond to real adapter display names (such as "VIA Rhine II Fast Ethernet Adapter") used by Windows™ Management Instrumentation (WMI) 54 when managing network adapter events. Therefore, in this embodiment, for each adapter in the original list of network adapters, additional processing is performed to identify a hardware ID and a real adapter display name. As will be described in detail below, in this embodiment, obtaining the hardware ID is used to identify physical (wired or wireless) network adapters from among those in the original list of network adapters, and the real adapter display name of an adapter is used to obtain notifications of events concerning that adapter from WMI 54.

Block 254 causes the processor circuit 12 to repeat the steps described below for each network adapter in the list of network adapters obtained in block 252, until there are no network adapters left in the list to process.

For each network adapter, block 262 directs the processor circuit 12 to retrieve a real adapter display name from an INetCfg software interface of Windows™. More particularly, block 262 directs the processor circuit 12 to initialize the INetCfg software interface by making appropriate calls to CoCreateInstance( ) InetCfg::Initialize( ) and InetCfg::EnumComponents( ) as is known in the art. A description of relevant Windows™ software constructs may be found generally in the MSDN library at http://msdn.microsoft.com, and more particularly, at http://msdn.microsoft.com/library/en-us/network/hh/network/nffrf_82fdd57e-4ee5-4ec5-93f3-b661bf2a7093.xml.asp, the entire content of which is incorporated herein by reference. The InetCfg::EnumComponents( ) function retrieves an enumeration comprising a collection of unordered network components of a particular type that are installed on the operating system 40. However, this collection of components from InetCfg includes many components other than the network adapters which are of interest, i.e., those retrieved in block 252.

Therefore, in this embodiment, block 252 directs the processor circuit 12 to sort through the InetCfg components to identify only components corresponding to entries in the list of network adapters produced at block 252. Block 262 directs the processor circuit 12 to traverse the InetCfg components of the collection in a loop, invoking the IEnumNetCfgComponent::Next( ) function to retrieve the next InetCfg component in the enumeration sequence. For each InetCfg component retrieved, block 262 directs the processor circuit 12 to retrieve a globally unique identifier (GUID) of the InetCfg component, by calling the INetCfgComponent::GetInstanceGuid( ) function of Windows™. Block 262 then directs the processor circuit 12 to test whether the GUID retrieved from the InetCfg component matches the GUID of the network adapter currently being processed from the list of network adapters produced by block 252. If there is a match, the current InetCfg component corresponds to the network adapter being processed.

Block 262 then directs the processor circuit 12 to call the INetCfgComponent:GetDisplayName( ) function with the GUID obtained in block 262 as a parameter, to obtain the real adapter display name of that adapter.

Block 264 then directs the processor circuit 12 to obtain the hardware identifier (ID) of the network adapter being considered by calling InetCfgComponent:GetID( ) with the GUID as a parameter. The hardware identifier comprises a character string (e.g., "PCIWEN_102C&DEV_00E0"). Generally, the first portion of a hardware identifier of a physical adapter is its BUS type, and typically includes one of the following strings: "PCI" or "USB" or "PCMCIA". For example, the bus type of an adapter having the hardware identifier "PCIWEN_102C&DEV_00E0" is clearly "PCI", signifying that this adapter is a physical adapter. Thus, by examining the hardware identifier, block 266 is able to distinguish physical adapters (i.e., those having a predefined bus type) from virtual adapters.

Many networking-related applications add virtual adapters into Windows™ to help them manipulate traffic, but this embodiment does not attempt to control virtual adapters as doing so may lead to unexpected results and, in any event, disabling a virtual adapter does not necessarily disable a physical wireless network adapter associated with the virtual adapter. Thus, physical wireless network adapters may pose a security risk, unless they are identified and then disabled when a wired connection is established to the system 10 through a wired network adapter.

In the present embodiment, block 266 directs the processor circuit 12 to test each hardware identifier retrieved in block 264 to ascertain whether the network adapter associated with the hardware identifier corresponds to a physical bus type, by checking whether the hardware identifier includes a predefined bus type identifier such as "PCI" or "USB" or "PCMCIA", for example.

If the processor circuit 12 determines at block 266 that a network adapter is not a physical adapter, no further processing is done in respect of this network adapter since it deemed to be a virtual adapter, and the processor circuit is returned to block 254 to process the next network adapter in the list of network adapters produced in block 252. On the other hand, if the processor circuit 12 determines that the currently processed network adapter is a physical adapter, the processor circuit 12 is directed to block 268.

Having determined that the current network adapter is a physical network adapter, the processor circuit 12 is next directed to identify its type, and in particular, to determine whether the current network adapter is wired or wireless. The process for identifying a wireless network adapter may vary in different embodiments, and may also vary according to the operating system that is installed in the system 10. In this embodiment, as described below, the process involves directing the processor circuit 12 to determine whether a particular wireless network interface is associated with at least one predefined attribute indicative of a wireless network interface.

In this embodiment, block 268 directs the processor circuit 12 to determine whether the operating system 40 of the system 10 is Windows™ XP or newer. If the processor circuit 12 determines that the operating system 40 is Windows™ XP or newer, the processor is directed to block 270; otherwise, the processor is directed to block 282.

For cases where the operating system is Windows™ XP or newer, blocks 270 to 280 direct the processor circuit 12 to use the Windows™ Management Instrumentation (WMI) block 54 to determine whether each physical network adapter identified at block 266 supports at least one predefined wireless adapter identifier or attribute. Most wireless network adapters support IEEE 802.11 wireless LAN object identifiers (OIDs), among which the 802.11 service set object identifier is considered mandatory. Therefore, if a network adapter supports this identifier, it can be considered to be a wireless network adapter. It is worth noting, however, that various Windows™ programming interfaces may refer to the 802.11 service set identifier by various names. For example, the WMI block 54 programming interlace refers to this identifier as OID_802_11_SSID, whereas the device input and output control (IOCTL) interface refers to it as "MSNdis_802_11_ServiceSetIdentifier".

Therefore, in one embodiment, block 270 directs the processor circuit 12 to perform a query of the Windows™ Management Instrumentation (WMI) block 54 to determine whether the network adapter being considered supports OID_802_11_SSID. A network adapter found to support OID_802_11_SSID is determined to be a wireless network adapter and is added to a wireless adapters list 210. A method of performing a query of WMI 54 to determine whether a particular wireless network interface supports the 802.11 service set object identifier (OID), i.e., OID_802_11_SSID, will now be described.

Several preparatory steps are taken by the processor circuit 12 at block 270 to connect to WMI. First, block 270 directs the processor circuit 12 to call the Windows™ function CoCreateInstance( ) to create an instance of a Web-Based Enterprise Management (WBEM) locator object. Next, the created WBEM locator object is used to connect to a server of WMI 54 by a call to its WbemLocator::ConnectServer( ) function. Authentication of the connection is established by a call to the CoSetProxyBlanket( ) function.

Block 270 directs the processor circuit 12 to cause an instance enumerator to be created for the class "MSNdis_802_11_ServiceSetIdentifier". This is done by calling the function IWbemServices::CreateInstanceEnum( ) with parameters specifying that the name of the class for which instances are desired is "MSNdis_802_11_ServiceSetIdentifier", and that only the root should be enumerated (i.e., enumeration is to be limited to pure instances of this class). All enumerated instances in this class are then traversed in a loop by using the IEnumWbemClassObject::Next( ) method, to search for just one object including an instance string matching the real adapter display name. Block 272 calls the IWbemClassObject::Get( ) method to check whether the instance string obtained matches the current adapter display name. In other words, block 272 directs the processor circuit 12 to test whether "MSNdis_802_11_ServiceSetIdentifier.InstanceName={adapter display name}". If the result is "TRUE", the adapter just processed supports the "MSNdis_802_11_ServiceSetIdentifier" class (i.e., OID_802_11_SSID), and therefore, at block 286, the processor circuit 12 adds an identifier representing this adapter to the wireless adapter list 210.

Although the Windows™ Management Instrumentation (WMI) block 54 on Windows™ XP and newer Windows™ operating systems is supposed to support queries of MSNdis_802_11_ServiceSetIdentifier for wireless adapters as described above, unfortunately this turns out not to be the case for some wireless network adapters. To cover instances in which the above test fails, a further test for detecting a wireless adapter is performed by blocks 274 and 276.

Block 274 directs the processor circuit 12 to call the WMI block 54 to retrieve the MSNdis_PhysicalMediumType attribute associated with the network adapter. If the MSNdis_PhysicalMediumType attribute is equal to MSNdis_PhysicalMediumWirelessLan, this confirms that the network adapter being examined is a wireless network adapter, in which case the processor circuit 12 is directed to block 286 to add a representation of the adapter currently being processed to the wireless adapter list 210, after which block 254 is executed to process the next adapter (if any).

The process for determining the MSNdis_PhysicalMediumType attribute of a particular physical network adapter is similar to the steps taken above in respect of the "MSNdis_802_11_ServiceSetIdentifier" attribute. Block 274 directs the processor circuit 12 to create an instance enumerator for the class "MSNdis_PhysicalMediumType" by invoking IWbemServices::CreateInstanceEnum( ). All instances found in this class are then traversed in a loop by using the IEnumWbemClassObject::Next( ) method, to obtain an instance string representing the adapter display name. Block 276 directs the processor circuit 12 to test whether the obtained instance string matches the current adapter display name, i.e., whether "MSNdis_PhysicalMediumType.InstanceName={adapter display name}". If a match is found, the value of "NdisPhysicalMediumType" for this instance is retrieved using the IWbemClassObject::Get( ) method. If the value retrieved is "NdisPhysicalMediumWirelessLan", block 286 directs the processor circuit 12 to add a representation of the network adapter to the wireless adapter list 210. Any adapter which fails the tests in blocks 272 and 276 for identifying a wireless adapter is deemed to be a wired network adapter and thus block 278 directs the processor circuit 12 to add an identification thereof to the wired adapter list 208 in block 278. (The adapter is not a virtual adapter since virtual adapters were previously eliminated at block 266.)

Although two specific tests of this embodiment have been described above for distinguishing wired and wireless adapters, it will be appreciated that, in a different embodiment, tests relying on other network adapter attributes might conceivably be used in addition to, or instead of, the above tests, and possibly in a different order, in order to distinguish wired and wireless adapters.

In illustrative embodiments, any wireless network adapters in the system 10 are disabled, in response to detection of a network connection to any wired network adapter of the system 10. Consequently, it is desirable to accurately detect and track the presence and connection state of both wired and wireless adapters in the system 10. In particular, it is desirable to detect and track when wired or wireless adapters are added and removed, and to detect wired network connections (and disconnections) with any of the wired network adapters. The addition of a physical network adapter to the system 10 may be effected by connecting or installing a new physical network adapter, or by enabling an already connected or installed, disabled, network adapter. Conversely, the removal of a physical network adapter can be effected by physically removing a connected or installed physical network adapter, or by disabling a physical network adapter connected or installed in the system 10. A wired network connection is typically established by connecting a network cable to a wired network interface connector (e.g., 13 in FIG. 1) of a wired network adapter.

In this embodiment, the addition or removal of physical network adapters, and the setup and tear down of wired network connections, may be detected by monitoring Ndis event signals received from the WMI 54 block as a result of connecting to a "sink" interface of the WMI block. In the Windows™ operating system, a "sink" is a software construct (basically, an object) allowing an application or service to receive notifications from the Windows™ operating system about operating system events. To be able to receive, or "sink", notifications of such events, the application or service must register as a temporary event consumer using special procedures of the WMI block 54. For example, if a user uses a Device Manager application of the Windows™ operating system to disable or uninstall an existing network adapter, this action can cause a MSNdis_NotifyAdapterRemoval event signal to be sent to the security service 42, if a sink object interface has been registered to "subscribe" to the MS Ndis_NotifyAdapterRemoval event.

Accordingly, in this embodiment, block 280 directs the processor circuit 12 to implement a method of subscribing to relevant Ndis event notifications from the WMI 54 block, to facilitate keeping the wired and wireless adapter lists (208 and 210) up to date and making decisions about enabling/disabling wireless adapters of the system 10. More particularly, for each wired adapter, block 280 directs the processor circuit 12 to register a call back sink object, derived from IWbemObjectSink, with the WMI block 54, to enable the security service to receive MSNdis_StatusMediaConnect, MSNdis_StatusMediaDisconnect and MSNdis_NotifyAdapterRemoval event signals, indicating that that wired adapter has been connected to, disconnected from, or removed from, the system 10, respectively. Block 280 calls an ExecNotificationQueryAsync( ) function of the WMI block 54 to register the sink object as a consumer of the Ndis connect, disconnect and removal events for the wired adapter currently being processed, by specifying parameters including the real adapter display name (obtained in block 262) and a special SQL string, as shown in the following example code:

```
HRESULT ExecNotificationQueryAsync(
    const BSTR strQueryLanguage,        ;"WQL"
    const BSTR strQuery,                ; SQL string, see below
    long lFlags,                        ; 0
    IWbemContext* pCtx,                 ; 0
    IWbemObjectSink* pResponseHandler;  ; m_pWMISink
                                        // IWbemObjectSink
) ;
SQL strings:
To register for MSNdis_StatusMediaConnect events:
"SELECT * FROM MSNdis_StatusMediaConnect WHERE
InstanceName = 'ADN'"
To register for MSNdis_StatusMediaDisconnect events:
"SELECT * FROM MSNdis_StatusMediaDisconnect WHERE
InstanceName = 'ADN'"
To register for MSNdis_NotifyAdapterRemoval events:
"SELECT * FROM MSNdis_NotifyAdapterRemoval WHERE
InstanceName = 'ADN'"
'ADN' is the adapter display name, for example "VIA Rhine II
Fast Ethernet Adapter", which we obtained from INetCfg.
```

In this way, an adapter display name associated with a wired network interface (which, in this embodiment, includes the wireless network interface connector 15 and the wireless network interface adapter 24) is used by the processor circuit 12 in this embodiment to register a Windows Management Instrumentation (WMI) sink interface used by the Ndis events handler 66 to receive notifications of Ndis events relating to the wired network interface.

A sink object corresponding to the wired adapter is instantiated in a respective thread of the Ndis events handler 66, as shown by 108 in FIG. 3. In this embodiment, the sink object represents a subscription to three Ndis events of interest (i.e., connect, disconnect, and removal) for the wired network adapter. The sink object implements an Indicate( ) call back function used by the WMI 54 block to notify the Ndis events handler 66 of relevant Ndis events. To signal occurrence of a relevant Ndis event to a sink object registered to receive that event, WMI 54 calls the Indicate( ) function of the sink object.

It will be recalled that the processor circuit 12 at block 204 of FIG. 4 created a number of event objects for internal use by the security service 42, including an adapter connect event object, an adapter disconnect event object, and an adapter removal event object. In this embodiment, when the WMI block 54 directs the processor circuit 12 to signal an Ndis event to the Ndis events handler 66 by calling the Indicate( ) function of the respective sink interface, the Indicate( ) function directs the processor circuit 12 to set the corresponding internal event object to a signaled state. For example, when the Indicate( ) function receives notification of an Ndis connect event, it directs the processor circuit 12 to call the SetEvent( ) function to set the adapter connect event object to a signaled state, as described above.

When one of the internal event objects is set to a signaled state, the adapter controller block 63 is thereby informed of the event, and block 212 of FIG. 4 directs the processor circuit 12 to respond to the event appropriately as described above. Effectively, the security service 42 directs the processor circuit 12 to monitor Ndis "connect", "disconnect", and "removal" events for each physical wired network adapter, to detect the setup and breakdown (i.e., disconnection) of network connections of physical wired network adapters of the system 10 to other computers or computing devices.

Referring again to FIG. 5, after the above sink interfaces to Ndis events have been created, the processor circuit 12 is directed back to block 254, where the next adapter from the original list of network adapters is evaluated in the loop of code as described above, to detect whether it may be a wired or wireless network adapter.

It will be recalled that the foregoing method of identifying physical wireless network adapters is applied subsequent to a determination at block 268 that the operating system in the system 10 is Windows XP™ or newer. However, if the security service is installed in a system utilizing Windows 2000™, for example, the WMI block 54 may not support any wireless adapter related instances, therefore an alternative method of distinguishing wired and wireless adapters is provided in this embodiment at blocks 282 and 284.

In systems which use the Windows 2000™ operating system in particular, wireless network adapters can be identified by relying on the DeviceIoControl( ) command of Windows™ to perform appropriate queries to the Windows™ network subsystem 52, as illustrated in block 282 of FIG. 5. In order to use the DeviceIoControl( ) function to retrieve information from a network adapter, a file pointing to the network adapter is first opened. Block 282 directs the processor circuit 12 to call a CreateFile( ) function of Windows™, and pass the adapter name as the IpFileName parameter (i.e., specifying the name of the object to open). If successful, the CreateFile( ) function directs the processor circuit 12 to return a handle (i.e, pointer) to the specified file. The DeviceIoControl( ) function is then called, passing, as parameters: the handle from CreateFile( ) pointing to the network adaptor; a pre-defined value IOCTL_Ndis_QUERY_GLOBAL_STATS to indicate that the processor circuit 12 should cause information about the network adapter to be retrieved; and a parameter indicating that, in particular, OID_802_11_SSID information should be retrieved from the adapter which is currently being evaluated.

It will be recalled, referring to block 270, that OID_802_11_SSID is a mandatory predefined object identifier for IEEE 802.11 wireless adaptors. Accordingly, if the results of the call to the DeviceIoControl( ) function indicate that the adapter under consideration supports OID_802_11_SSID, it is considered that it is a wireless adapter and therefore block 286 directs the processor circuit 12 to add an identification thereof to the wireless adapter list 210. If the adapter under consideration does not support OID_802_11_SSID, it is deemed to be a wired adapter and therefore block 278 directs the processor circuit 12 to an identification thereof to the wired adapter list 208, whereupon block 280 directs the processor circuit 12 to create suitable sinks, as previously described. The next adapter identified from block 252 is then processed in accordance with the loop starting at block 254 until no further adapters remain to be processed. In this way, the present embodiment identifies wired and wireless network interfaces from among the one or more network interfaces detected by the processor circuit 12 in block 252.

Once all the adapters identified in block 252 have either been eliminated as being non-physical or have been classified by type (e.g., as wired or wireless), the processor circuit 12 is directed to block 288.

Block 288 directs the processor circuit 12 to determine whether any wireless adapters were identified among all the network adapters of the system 10. If no wireless adapters were identified, block 288 directs the processor circuit 12 to set the no wireless adapters event object using the SetEvent( ) function, to inform the GUI notifier 70 that it should update the user display to indicate that no wireless adapters were found in the system 10 to enable/disable.

Block 290 then directs the processor circuit 12 to register another call back sink object to receive MSNdis_NotifyAdapterArrival events, signaling a network adapter being installed, connected, or enabled in the system 10. This sink object is associated with its own Indicate( ) call back function, and is instantiated in its own Ndis events handler 66 thread. As will be seen from block 250 in FIGS. 4 and 5, whenever an Ndis arrival event occurs in this embodiment, the processor circuit 12 executes the initialization procedure in process 250 again to produce new wired and wireless adapter lists 208 and 210. In this embodiment, a sink interface for MSNdis_NotifyAdapterArrival events may be setup as follows:

```
HRESULT ExecNotificationQueryAsync(
    const BSTR strQueryLanguage,      ;"WQL"
    const BSTR strQuery,              ; SQL string, see below
    long lFlags,                      ; 0
    IWbemContext* pCtx,               ; 0
    IWbemObjectSink* pResponseHandler ; m_pWMISink
// IWbemObjectSink
);
SQL string:
"SELECT * FROM MSNdis_NotifyAdapterArrival"
```

It will be recalled that in block 280, three Ndis events were registered for one sink object corresponding to a wired network adapter. However, "arrival" events (e.g., the addition or enablement of a physical wired network adapter) are not tied to any specific existing network adapter, therefore only one sink object in total is used in this embodiment to detect and track all MSNdis_NotifyAdapterArrival events. Since the identity of an "arriving" adapter is not known a priori, when the WMI block 54 calls the Indicate( ) function, it passes information about the adapter name in a call parameter.

Whenever the Ndis events handler 66 receives notification of an Ndis arrival event from the WMI block 54, the adapter arrival event object created by block 204 is set to a signaled state, to inform the adapter controller block 63 of the event. The adapter controller block 63 then processes the event (in block 250, shown in FIGS. 4 and 5). Effectively, the security service 42 directs the processor circuit 12 to monitor Ndis "arrival" events for both physical wired and wireless network adapter, in order to keep its wired and wireless adapter lists (208 and 210) up to date, and these lists are then used to decide whether the wireless adapters of the system 10 should be disabled or enabled.

Having established the wired and wireless adapter lists 208 and 210 and having setup appropriate sink connections to the WMI block 54 to receive notifications of relevant Ndis events, the security service 42 next causes the processor circuit 12 to execute the blocks of codes shown at 350 in FIG. 6, to determine the current connection status for each wired network adapter, and then to enable or disable the wireless network adaptors accordingly.

FIG. 6: Check Wired Network Connection Status; Set Wireless Adapters

Referring to FIG. 6, blocks of code 350 are shown for checking the connection status of all wired adapters in the system 10, and disabling all the wireless adapters of the system 10 if at least one wired adapter is connected to a wired network, or enabling all the wireless adapters if no wired adapter is connected to the wired network.

Block 352 directs the processor circuit 12 to set a local boolean variable, wiredConnected, to FALSE by default. Block 354 then directs the processor circuit 12 to test whether the connection status of all the wired adapters has been checked. If not, the next wired adapter is processed in the loop as follows. Block 356 directs the processor circuit 12 to perform a query to the WMI block 54 to obtain the MSNdis_MediaConnectStatus attribute of the present wired adapter. Assuming the WMI block 54 has already been initialized as described above in relation to block 270 of FIG. 5, block 358 directs the processor circuit 12 to invoke the IWbemServices::CreateInstanceEnum method to create an instance enumerator for the class "MSNdis_MediaConnectStatus". Then, block 358 directs the processor circuit 12 to use the IEnumWbemClassObject::Next( ) method to loop through all instances within this class. Finally, the IWbemClassObject::Get( ) function is called, and the processor circuit 12 is directed to determine if the returned instance string matches the current adapter display name. If a match is found, block 358 directs the processor circuit 12 to obtain the value of the "NdisMediaConnectStatus" attribute for this instance.

At block 358, the processor circuit 12 tests whether the MSNdis_MediaConnectStatus attribute obtained is equal to Ndis_MediaStatusConnected, a predefined value indicating that the wired adapter is presently connected to a wired network. If the result is yes, the processor circuit 12 sets the local variable wiredConnection to TRUE, and the processor circuit 12 is directed back to blocks 354 and 362. If the present wired network adapter does not have a wired connection, the processor circuit 12 returns to block 354 to process the next wired adapter in the wired adapter list.

Once all the wired adapters in the wired adapter list 208 have been processed, if at least one wired adapter was found, at block 358, to have a connection with a wired network, block 366 directs the processor circuit 12 to call the network adapter manager block of codes (shown at 400 in FIG. 7) for disabling all wireless adapters in the system 10. If, on the other hand, at block 362 the processor detects that none of the wired adapters in the wired adapter list 208 is connected to a wired network, block 364 directs the processor circuit 12 to call block 400, to cause all the wireless adapters in the wireless adapter list 210 to be enabled. In either case, block 400 is passed a parameter indicating whether a disable or enable operation is desired.

Effectively, in this embodiment, detecting the disconnection of a network connection from a wired network interface to a wired network involves directing the processor circuit 12 to check the connection status for all wired interfaces detected as being installed in the system, and to determine that none of the detected wired interfaces has a network connection with a wired network. Other embodiments may use other methods to detect whether a network connection with a wired network interface has been disconnected.

FIG. 7: Enabling/Disabling the Wireless Adapters

Referring now to FIG. 7, a block of codes for enabling or disabling a collection of wireless adapters and for annunciating a notification of having done so to the user, is shown generally at 400.

Block 400 directs the processor circuit 12 to take two input parameters: a boolean enable/disable flag 404 indicating whether it is desired to enable or disable wireless adapters, and also a pointer to the wireless adapter list 210 listing all the wireless adapters detected as installed in the system 10. For each entry in the wireless adapter list 210, an adapter hardware ID 408 is provided as an input to the process.

The process begins with block 402 which directs the processor circuit 12 to set a local variable entitled DoEnable to the value of the boolean enable/disable flag 404 passed as an input parameter.

Then the wireless adapters listed in the wireless adapter list 210 are each processed in an outer loop beginning at block 406. Block 406 instructs the processor circuit 12 to test whether there are any more adapters to process in the wireless adapter list 210. If not, the routine ends. If there is at least one more wireless adapter to process, the processor circuit 12 is directed to block 410.

As will be described below, in this embodiment, in order to cause physical network adapters in the system 10 to be disabled or enabled, certain device installation functions of Windows™ having the prefix "SetupDi" are called by the processor circuit 12. Information about such functions can be accessed at http://msdn.microsoft.com/library/en-us/install/hh/install/SetupAPI_071eca3a-0cc3-4962-b3de-65dcf056c761.xml.asp, incorporated herein by reference.

Block 410 directs the processor circuit 12 to call the SetupDiClassGuidsFromNameEx( ) function of Windows™, to obtain a GUID (globally unique identifier) associated with the operating system-defined setup class entitled "Net", representing network adapters. A GUID is a 128-bit integer (16 bytes) which is unique for each class of hardware installed in the system 10. In this embodiment, the class GUID value is 4D36E972-E325-11OE-BFC1-08002BE10318. This class GUID value is subsequently used as a parameter to other Windows™ functions which examine or modify the state of the physical network adapters installed in the system 10.

Block 412 then directs the processor circuit 12 to call the SetupDiGetClassDevsEx( ) function to obtain a device information set identifying all devices of the "Net" class, i.e., all network adapters.

Next, block 414 directs the processor circuit 12 to call the SetupDiGetDeviceInfoListDetail( ) function to retrieve detailed information associated with the device information set obtained in block 412, and relating to the wireless adapter being processed.

Block 416 then directs the processor circuit 12 to initialize an internal device index variable (devIndex) to zero.

Block 418 marks the start of an inner loop of the process for traversing the set of installed devices of the class "Net" (i.e., network adapters), to find the hardware ID corresponding to the adapter to be controlled, which is the next un-processed wireless network adapter of the wireless adapter list 210. (The set of installed devices was determined earlier in block 412, and the next wireless network adapter to be processed was chosen from the wireless adapter list 210 at the top of the outer loop which begins at block 406.)

Block 418 then directs the processor circuit 12 to call the SetupDiEnumDeviceInfo( ) function to enumerate the next wireless network adapter in this class. Block 420 directs the processor circuit 12 to test whether there are any more installed devices (i.e., wireless network adapters) within this class for which device information may be retrieved. If not, the processor circuit 12 is directed back to block 406 to process the next adapter in the wireless adapter list 210.

If there are more devices to be processed within this class (i.e., network adapters), block 422 directs the processor circuit 12 to call the CM_Get_Device_ID_Ex( ) function of Windows™ to obtain the network adapter instance ID of the present adapter. Next, block 424 directs the processor circuit 12 to call the SetupDiGetDeviceRegistryProperty( ) function, to obtain the hardware ID for this wireless network adapter. The parameters passed to SetupDiGetDeviceRegistryProperty( ) include the device information set received in block 412, information about the network adapter instance, and an identification of SPDRP_HARDWAREID as the property to be set.

Block 426 directs the processor circuit 12 to test whether the hardware ID retrieved in block 424 matches the hardware ID of the wireless adapter that it is desired to control. If not, the device index (devIndex) is incremented at block 428 and the processor circuit 12 is directed to the start of the inner loop at block 418. If there are any further devices in this hardware class (i.e., network adapters) remaining to be processed, the processor circuit 12 is directed to block 422; otherwise, the processor circuit 12 is directed to the beginning of the outer loop at block 406 to process the next adapter in the wireless adapter list 210.

If, at block 426, the processor circuit 12 is able to match the hardware ID obtained in block 424 with the hardware ID of the device desired to be controlled, the processor circuit 12 is directed to block 430.

Block 430 directs the processor circuit 12 to call the SetupDiSetClassInstallParams( ) function of Windows™ to setup the desired class installation parameters. If DoEnable is TRUE, then the installation parameters are set to configure the wireless adapter to be enabled. If DoEnable is FALSE, then the installation parameters are set to configure the wireless adapter to be disabled.

Following block 430, block 432 directs the processor circuit 12 to call the SetupDiCallClassInstaller( ) function of Windows™, with parameters including a hardware identifier identifying the precise physical network adapter to be re-configured, and specifying a device installation request (DIF code) of DIF_PROPERTYCHANGE, which is a predefined value in Windows™ indicating that a device is being enabled, disabled, restarted, stopped, or that its properties are changing. The call to the SetupDiCallClassInstaller( ) thus applies the parameters set up in block 430, thereby effecting either an enable or disable operation (depending on the value of the DoEnable flag) for the network adapter being modified. If the DoEnable flag is set to "enable", then block 432 enables the wireless adapter; otherwise, it disables it. The parameters for effecting the DIF_PROPERTYCHANGE installation request are stored in a SP_PROPCHANGE_PARAMS structure having a StateChange variable in which the predefined values DICS_ENABLE and DICS_DISABLE are stored to enable or disable the device, respectively. The hardware identifier associated with the wireless network adapter may be used as a parameter to the device installation functions identify which wireless network interface to enable or disable. For example, in this embodiment, the processor circuit 12 at blocks 430 and 432 calls particular device installation functions as follows:

```
WINSETUPAPI BOOL WINAPI
   SetupDiSetClassInstallparams(
   IN HDEVINFO DeviceInfoSet,;devs
   IN PSP_DEVINFO_DATA DeviceInfoData, OPTIONAL; &devInfo
   IN PSP_CLASSINSTALL_HEADER
   ClassInstallParams, OPTIONAL; &pcp / /see below
   IN DWORD ClassInstallParamsSize; sizeof(pcp)
);
WINSETUPAPI BOOL WINAPI
   SetupDiCallClass Installer(
```

```
IN DI_FUNCTION InstallFunction, ; DIF_PROPERTYCHANGE
IN HDEVINFO DeviceInfoSet, ; devs
IN PSP_DEVINFO_DATA DeviceInfoData OPTIONAL; &devInfo
);
SP_PROPERCHANGE_PARAMS pcp;
  pcp.ClassInstallHeader.cbSize=
    sizeof(SP_CLASSINSTALL_HEADER);
  pcp.ClassInstallHeader.InstallFunction =
    DIF_PROPERTYCHANGE;
  pcp.StateChange = DICS_DISABLE or DICS_ENABLE;
  pcp.Scope = DICS_FLAG_GLOBAL;
  pcp.HwProfile = 0;
```

Causing a wireless network adapter to be disabled by the above method renders it inoperable at the hardware level, and in some embodiments, may actually cause the wireless network adapter to be powered down. Advantageously, other software in the system 10 may not detect the wireless network adapter after it has been disabled in this way.

Block 432 directs the processor circuit 12 to check a return code from the SetupDiCallClassInstaller( ) function to determine if the attempted setup/enable operation succeeded. For example, a wireless adapter may fail to shut down or start up due to a software or hardware bug, thus necessitating the taking of corrective action. If an error code was returned, special procedures are invoked to shut down the wireless adapter. In this way, the present embodiment directs the processor circuit 12 to verify that the wireless network interface was successfully disabled and to take corrective action if it was not.

Experiments have shown that one of the reasons that an attempted enable/disable operation may fail for a network adapter is that the network adapter was improperly installed, for example, by registering a non-existent co-installer DLL function. In this embodiment, this problem is dealt with by removing any references in the Windows™ registry to the registered co-installer DLL and then attempting the enable/disable operation again for this particular network adapter. Hence, block 432 directs the processor circuit 12 to perform the following series of steps in an attempt to correct the problem:

1. Open a net installer section of the registry corresponding to network adapter devices through a call to SetupDiOpenClassRegKeyEx( )
2. Perform a loop to enumerate all the sub-keys of the net installer section through iterated calls to RegEnumKeyEx( ) to return a valid registry key handle;
3. Open a registry key corresponding to the registry key handle found in step 2 by calling RegOpenKeyEx( )
4. Using the opened registry key, obtain an instance identifier of a registry entry named NetCfgInstanceId;
5. Compare the instance identifier obtained in step 4 to the name of the wireless network adapter for which the enable/disable operation failed. If a match is found, proceed to step 6; if not, continue enumerating the next registry sub-key by looping back to step 2 until no further sub-keys remain to enumerate;
6. Try to open a registry entry named CoInstallers32 corresponding to the wireless network adapter;
7. If such an entry exists, delete the CoInstallers32 entry, create a new CoInstallers32_bad entry, and set it to the value of the deleted CoInstallers32 entry, thus effectively removing any reference to the bad CoInstaller32 entry.

At this point, block 432 directs the processor circuit 12 to call the SetupDiCallClassInstaller( ) function to again try the enable/disable operation. If the SetupDiCallClassInstaller( ) function returns another error code, additional corrective actions may optionally be undertaken by the processor circuit 12 in some embodiments before passing to block 434.

Block 434 directs the processor circuit 12 to invoke the SetEvent( ) function of Windows™ to signal (68) the occurrence of the appropriate GUI notification event to the GUI notifier 70. The GUI notifier 70 is a process providing notifications via a graphical user interface (GUI) to a user of the system 10 of significant events, in this embodiment, by updating displaying various icons in a taskbar region of the display. For example, if all wireless adapters are enabled, the GUI notifier 70 may display an antenna icon in the taskbar. If all wireless adapters are disabled, the GUI notifier 70 may display an antenna icon with a padlock.

In this embodiment, if the wireless adapter was successfully enabled in block 432, block 434 directs the processor circuit 12 to cause the wireless enabled event object to be set to a signaled state. Similarly, block 434 directs the processor circuit 12 to set the wireless disabled, the enable failed and disable failed event objects depending on the results of block 432. It will be appreciated that since a GUI notification event may be signaled for multiple wireless adapter cards, the GUI notifier 70 may be faced with multiple GUI event objects being set to a signaled state. A priority scheme is therefore used by the GUI notifier 70 to give priority to error events. Thus, if the GUI notifier 70 receives notification of both a wireless disabled event and a wireless disable failed event, the latter will take priority and be the final result. Accordingly, an error indication will be displayed to the user in the display area.

Operation

A brief illustration of the operation of this embodiment is now provided.

The security service 42 and its associated GUI notifier 70 are loaded into memory 14 during startup by the processor circuit 12 under the direction of the Windows™ service control management block 50. The initialization and setup block 60 then directs the processor circuit 12 to prepare the security service 42 for operation by launching the service control event handler 100 and the network adapter manager thread 62, which includes the adapter controller 63 object.

The adapter controller 63 directs the processor circuit 12 to create a plurality of custom event objects 204 to allow the security service 42 to respond to Ndis event 116 signals, to signal GUI notifier 70 update notifications 68, and to stop the service.

The adapter controller 63 also directs the processor circuit 12 to create 108 a plurality of Ndis events handler 66 threads for receiving and thereby detecting Ndis events 116, such as connections and disconnections of network adapters, as well as arrivals and removals of the network adapters (i.e., connect, disconnect, arrival and removal events). The Ndis events handler 66 directs the processor circuit 12 to monitor Ndis events by registering (110) with the WMI block 54 through a plurality of sink objects, to receive specific Ndis events relating to adapters of interest.

Furthermore, the adapter controller 63 directs the processor circuit 12 to create 104 the network adapter manager 64 object, associated with network adapter manager 64 blocks of code. When the network adapter manager 64 object is created 104, it directs the processor circuit 12 to query (112, 114) the Windows™ network subsystem 52 and InetCfg and SetupAPI blocks 56 of Windows™ to obtain hardware information including an initial list of installed adapters. The initial list is processed, as shown in blocks 262 to 286 of FIG. 5, to produce a wired adapter list 208 and a wireless adapter list 210, each composed of non-virtual, physical adapters.

In response to notifications of Ndis events received 116 from the WMI block 54, corresponding internal event objects are set by the processor circuit 12 to a signaled state to produce Ndis event notifications 118 to the adapter controller 63 regarding the occurrence of the Ndis events.

In response to the Ndis event notifications 118, if the processor circuit 12 under the direction of the adapter controller 63 detects, using the process shown in blocks 352 to 362 in FIG. 6, that at least one wired adapter in the wired adapter list 208 has had a "connect" event (e.g., established a network connection to a wired network), then the network adapter manager 64 directs the processor circuit 12 to disable all the wireless adapters in the wireless adapter list 210 using the process shown in FIG. 7.

After a command is issued (432) to disable or enable a particular wireless adapter, the adapter manager block 64 directs the processor circuit 12 to check whether the wireless adapter was successfully disabled or enabled. If yes, the GUI notifier 70 directs the processor circuit 12 to notify the user of the successful enablement or disablement of the wireless network interface. If not, the processor circuit 12 is directed to take corrective action and then to attempt again to disable or enable the wireless network interface. For example, in this embodiment, the corrective action may involve correcting incorrect registration information relating to the wireless adapter in an operating system 40 registry.

To extend the illustration, if only one wired adapter was previously detected as having a network connection, and an Ndis disconnect or removal event is detected by the processor circuit 12 for that wired adapter, then the Ndis events handler 66 directs the processor circuit 12 to notify the wireless adapter controller 64 of the Ndis event. The wireless adapter controller 64 then directs the processor circuit 12 to traverse its wireless adapter list 210 and enable each wireless adapter represented in the list by a series of calls to the INetCfg and SetupAPI block 56 of the Windows™ operating system. Effectively, the wireless adapter controller 64 directs the processor circuit 12 to detect the disconnection of the system 10 from the wired network, and causes the wireless network adapters to be enabled in response to detecting this disconnection.

The security service 42 then directs the processor circuit 12 to continue to wait for further Ndis events, responding to them as described above and illustrated in FIG. 4. When the Windows™ SCM 50 directs the processor circuit 12 to signal a stop or shutdown event to the service control handler 100 function, that function directs the processor circuit 12 to set the internal stop event object to a signaled state. In response to the stop event object being set to a signaled state, all held resources are released (214), all wireless adapters are enabled (216), the network adapter manager 64 object is deleted (218), and interfaces to Windows subsystems such as the WMI block 54 are shut down (e.g., 220), whereupon the security service 42 terminates.

Effectively, then, this embodiment is operable to direct a processing circuit 12 to cause a wireless network interface of a computing device 11 to be disabled, in response to detection of a network connection between the computing device and a wired network such as 30. This may involve detecting a network connection between the wired network interface of the computing device 11 and the wired network 30. This embodiment is also operable to direct the processing circuit 12 to detect a disconnection of the network connection, and to cause the wireless network interface to be enabled in response to the disconnection. In this embodiment, the wireless network interface includes a wireless network interface connector 15 and a wireless network interface adapter 24 connectable thereto, however other embodiments may disable and enable other kinds of wireless network interfaces according to the methods described herein. Notifications of whether the wireless interfaces of the system 10 have been disabled or not, or whether an error condition has occurred, are signaled to the GUI notifier 70, which directs the processor circuit 12 to display them to the user on the display 16.

The system 10 reduces the possibility that a user may inadvertently wirelessly broadcast a connection to the wired network 30 to unauthorized users, for example, hackers posing as a trusted wireless network or access point. Thus, hackers are prevented from "tunneling through" the wireless interface(s) to reach shared documents and resources on the user's computing device and on the company's secure wired network.

Although this embodiment has been described with reference to the Microsoft Windows™ operating system, it will be appreciated that many of these methods may be applied in the context of another operating system, in some cases by using programming interfaces native to that operating system or by using custom software facilitating interaction with the hardware in that context. While specific embodiments of the invention have been described and illustrated, such embodiments should be considered illustrative of the invention only and not as limiting the invention as construed in accordance with any claims that may accompany this or a corresponding application.

What is claimed is:

1. A method of enhancing network security of a computing system that includes a processor and an information storage device and that includes at least one physical wired network adapter and that includes at least one physical wireless network adapter, the method comprising:
producing an information structure in the storage device to indicate each wired network adapter and to indicate each physical wireless network adapter included in the computing system;
wherein producing the information structure includes, in response to arrival of each network adapter in the storage device,
determining whether the arrived network adapter is associated with an attribute indicative of at least one of a wireless network adapter and a wired network adapter,
based at least in part upon an outcome of the determination, configuring the information structure to indicate whether the arrived network adapter is a wireless network adapter or a wired network adapter;
in response to detecting an arrived network adapter establishing a connection to a network, referring to the information structure to determine whether a wired network adapter identified in the information structure has established the detected network connection to a wired network; and
in response to a determination that a wired network adapter included in the identified in the information structure has established the network connection to the wired network, using the processor to cause each physical wireless network adapter identified in the information structure to be disabled.

2. The method of claim 1,
wherein the information structure indicates a connection status for each wired adapter; and wherein producing the information structure further includes, in response to arrival of each network adapter in the storage device,
determining whether each arrived wired network adapter has a connection status that indicates connected.

3. The method of claim 2 wherein determining whether the arrived network adapter is associated with an attribute indicative of a wireless network adapter includes determining whether the arrived network adapter includes an indication that it supports a 802.11 service set object identifier (OID).

4. The method of claim 1 further comprising determining said establishing a network connection by monitoring Windows Management Instrumentation (WMI) Network Driver Interface Specification (Ndis) events.

5. The method of claim 4 wherein monitoring WMI Ndis events comprises detecting connect, disconnect, arrival and removal events.

6. The method of claim 1 wherein causing the physical wireless network adapter to be disabled comprises making calls to a SetupAPI block of Windows.

7. The method of claim 1 further comprising verifying that the physical wireless network adapter was successfully disabled, and, in response to detecting that the wireless network interface adapter failed to be disabled, taking corrective action by causing incorrect registration information relating to the wireless network interface adapter to be corrected in an operating system registry and then attempting again to disable said wireless network interface adapter.

8. The method of claim 1 further including,
in response to a determination that no wired network adapter included in the indicated in the information structure has an established network connection to a wired network, using the processor to cause each physical wireless network adapter identified in the information structure to be enabled.

9. The method of claim 1 wherein determining whether a wired network adapter has established a network connection comprises determining for each wired network adapter identified in the information structure whether a wired Ethernet network connection has been established.

10. The method of claim 1 further comprising notifying a user of disablement of said wireless network interface adapter.

11. The method of claim 1 wherein the act of causing each physical wireless network adapter identified in the information structure to be disabled comprises calling a device installation function to cause said physical wireless network adapter to be disabled.

12. The method of claim 1,
wherein determining whether a wired network adapter has established a network connection to a wired network includes using an adapter display name associated with a physical wired network interface adapter of said computing device to register a Windows Management Instrumentation (WMI) sink interface to receive notifications of Network Driver Interface Specification (Ndis) events relating to the wired network interface adapter.

13. The method of claim 12 wherein the act of causing each causing physical wireless network adapter identified in the information structure to be disabled further comprises using a hardware identifier associated with said wireless network interface adapter as a parameter to a device installation function operable to disable said physical wireless network adapter.

14. The method of claim 1 wherein the act of causing each physical wireless network adapter to be disabled comprises causing each physical wireless network adapter to be inoperable at a hardware level.

15. The method of claim 1 wherein the act of causing each physical wireless network adapter to be disabled comprises implementing an operating system service.

16. The method of claim 1 wherein causing each physical wireless network adapter to be disabled comprises causing at least one physical wireless network adapter to be powered down.

17. The method of claim 1,
wherein producing an information structure in the storage device to indicate each wired network adapter and to indicate each physical wireless network adapter included in the computing system includes producing a list of wired network adapters and a list of physical wireless adapters in the storage device.

18. The method of claim 1,
wherein the step of determining whether a wired network adapter identified in the information structure has established a network connection to a wired network by determining for each wired network adapter identified in the information structure whether a network connection is established includes determining whether a wired network adapter identified in the information structure has established an Ethernet connection.

19. The method of claim 1,
wherein the step of using the processor to cause includes using the processor to cause at least one physical 802.11 wireless network adapter identified in the information structure in the storage device to be disabled.

20. The method of claim 1,
wherein configuring the information structure to indicate whether the arrived network adapter is at least one of a wireless network adapter and a wired network adapter includes, in response to a determination that the arrived network adapter is a wired network adapter, associating a wired network adapter identifier with an indication of the network adapter in the information structure.

21. The method of claim 1,
wherein referring to the information structure to identify one or more wired network adapters includes identifying one or more wired network adapter identifiers within the information structure.

22. The method of claim 1 further including:
in response to an arrived network adapter disconnecting from the network, referring to the information structure to determine whether a wired network adapter identified in the information structure has a network connection to a wired network; and
in response to a determination that no wired network adapter included in the identified in the information structure has established a network connection to a wired network, using the processor to cause each physical wireless network adapter identified in the information structure to be enabled.

23. A system that includes a processor and an information storage device and that includes at least one physical wired network adapter and that includes at least one physical wireless network adapter, the system comprising:
means for producing an information structure in the information storage device to indicate each wired network adapter and to indicate each physical wireless network adapter included in the system;

wherein producing the information structure includes,
wherein producing the information structure includes, in response to arrival of each network adapter in the storage device,
    determining whether the arrived network adapter is associated with an attribute indicative of at least one of a wireless network adapter and a wired network adapter,
    based at least in part upon an outcome of the determination, configuring the information structure to indicate whether the arrived network adapter is a wireless network adapter or a wired network adapter;
means for in response to detecting an arrived network adapter establishing a connection to a network, referring to the information structure to identify one or more wired network adapters to determine whether a wired network adapter identified in the information structure has established the detected network connection to a wired network; and
means for causing each physical wireless network adapter identified in the information structure to be disabled in response to a determination that a wired network adapter included in the identified in the information structure has an established network connection.

24. The system of claim 23,
wherein the information structure indicates an arrived connection status for each wired adapter; and
wherein determining for each wired network adapter identified in the information structure whether a network connection is established includes determining whether at least one wired adapter includes a connection status that indicates connected.

25. The system of claim 24 wherein said means producing includes means for determining whether the arrived network adapter is associated with an attribute that indicates that it supports a 802.11 service set object identifier (OID).

26. The system of claim 23 wherein said means for determining the establishing a connection comprises means for monitoring Windows Management Instrumentation (WMI) Network Driver Interface Specification (Ndis) events.

27. The system of claim 26 wherein said means for monitoring WMI Ndis events comprises means for detecting Ndis connect, disconnect, arrival and removal events.

28. The system of claim 23 wherein said means for causing the physical wireless network adapter to be disabled comprises means for making calls to a SetupAPI block of Windows.

29. The system of claim 23 further comprising means for verifying that the physical wireless network adapter was successfully disabled, and means for taking corrective action by causing incorrect registration information in an operating system registry and relating to the physical wireless adapter to be corrected, responsive to detecting that the physical wireless network adapter failed to be disabled.

30. The system of claim 23 further comprising means for causing each physical wireless network adapter identified in the information structure to be enabled in response to determination that no wired network adapter included in the indicated in the information structure has an established network connection to a wired network.

31. The system of claim 23 wherein said means for determining comprises means for detecting said establishing a wired connection between a wired adapter and said wired network.

32. The system of claim 23 further comprising means for notifying a user of disablement of said physical wireless network adapter.

33. The system of claim 23 wherein said means for causing each physical wireless network adapter identified in the information structure to be disabled comprises means for calling a device installation function to cause said physical wireless network adapter to be disabled.

34. The system of claim 23 further comprising means for using an adapter display name associated with a wired Ethernet adapter of said computing device to register a Windows Management Instrumentation (WMI) sink interface to receive notifications of Network Driver Interface Specification (Ndis) events relating to a physical wired adapter that is a wired Ethernet adapter.

35. The system of claim 34 wherein said means for causing each physical wireless network adapter to be disabled further comprises means for using a hardware identifier associated with said physical wireless network adapter, for use as a parameter to a device installation function operable to disable said physical wireless network adapter.

36. The system of claim 23 wherein said means for causing each physical wireless network adapter to be disabled comprises means for causing each physical wireless network adapter to be inoperable at a hardware level.

37. The system of claim 23 wherein said means for causing the said physical wireless network adapter to be disabled comprises means for implementing an operating system service.

38. The system of claim 23 wherein said means for causing the said physical wireless network adapter to be disabled comprises means for powering down at least one physical wireless network adapter.

39. A computer program product comprising a computer-readable medium storing instructions that when executed by a processor circuit cause all the steps of claim 1 to be carried out.

40. A system for enhancing network security, the system comprising:
    a computing device that includes a processor and an information storage device and that includes at least one physical wired network adapter and that includes at least one physical wireless network adapter;
    wherein the processor circuit is configured to,
        produce an information structure indicia in the storage device to indicate each wired network adapter and to indicate each physical wireless network adapter included in the computing system;
        wherein producing the information structure includes, in response to arrival of each network adapter in the storage device,
            determining whether the arrived network adapter is associated with an attribute indicative of at least one of a wireless network adapter and a wired network adapter,
            based at least in part upon an outcome of the determination, configuring the information structure to indicate whether the arrived network adapter is a wireless network adapter or a wired network adapter;
        in response to detecting an arrived network adapter establishing a connection to a network, referring to the information structure to determine whether a wired network adapter identified in the information structure has established the detected network connection to a wired network; and
    in response to a determination that a wired network adapter included in the identified in the information structure has established the network connection to the wired network, using the processor to cause each physical wireless network adapter identified in the information structure to be disabled.

* * * * *